United States Patent
Robbins et al.

(10) Patent No.: US 10,502,876 B2
(45) Date of Patent: Dec. 10, 2019

(54) WAVEGUIDE OPTICS FOCUS ELEMENTS

(75) Inventors: Steven John Robbins, Bellevue, WA (US); Ian Anh Nguyen, Bellevue, WA (US); David D. Bohn, Fort Collins, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 328 days.

(21) Appl. No.: 13/477,646

(22) Filed: May 22, 2012

(65) Prior Publication Data

US 2013/0314793 A1 Nov. 28, 2013

(51) Int. Cl.
*G02B 5/18* (2006.01)
*G02B 27/01* (2006.01)

(52) U.S. Cl.
CPC .......... *G02B 5/18* (2013.01); *G02B 27/0172* (2013.01); *G02B 2027/0127* (2013.01); *G02B 2027/0134* (2013.01)

(58) Field of Classification Search
CPC .... G02B 5/18; G02B 27/017; G02B 27/0172; G02B 2027/0134; G02B 2027/0127; G02B 6/124; G02F 1/13342; G02F 2201/305
USPC .................. 359/629–634; 345/6–9, 632–633
See application file for complete search history.

(56) References Cited

U.S. PATENT DOCUMENTS

| | | |
|---|---|---|
| 3,410,774 A | 11/1968 | Barson et al. |
| 3,836,258 A | 9/1974 | Courten et al. |
| 3,906,528 A | 9/1975 | Johnson |
| 3,971,065 A | 7/1976 | Bayer |
| 4,711,512 A | 12/1987 | Upatnieks |
| 4,822,145 A | 4/1989 | Staelin |
| 4,860,361 A | 8/1989 | Sato et al. |
| 4,957,351 A | 9/1990 | Shioji |
| 5,019,808 A | 5/1991 | Prince et al. |

(Continued)

FOREIGN PATENT DOCUMENTS

| | | |
|---|---|---|
| CN | 1373385 A | 10/2002 |
| CN | 1440513 | 9/2003 |

(Continued)

OTHER PUBLICATIONS

Li, Guoqiang et al., "Switchable Electro-optic Diffractive Lens with High Efficiency for Ophthalmic Applications", *PNAS* Apr. 18, 2006 vol. 103 No. 16 6100-6104, Retrieved from: <http://www.pnas.org/content/103/16/6100.long> Feb. 22, 2012,(Feb. 2, 2006), 4 pages.

(Continued)

*Primary Examiner* — Cara E Rakowski
(74) *Attorney, Agent, or Firm* — Rainier Patents, P.S.

(57) ABSTRACT

In embodiments of waveguide optics focus elements, an imaging structure includes a waveguide for viewing of an environment that is viewable with the imaging structure. The waveguide transmits light of a virtual image that is generated to appear as part of the environment for augmented-reality imaging or virtual-reality imaging. The imaging structure also includes one or more focus elements that are integrated in the waveguide and switchable to focus the virtual image at a focus depth that approximately correlates to a focal distance of the environment. The focus elements can each be implemented for a different focus depth of the virtual image, and the focus depth is adjustable based on a combination of the focus elements being switched-on or switched-off.

20 Claims, 7 Drawing Sheets

(56) References Cited

U.S. PATENT DOCUMENTS

| | | | |
|---|---|---|---|
| 5,146,355 A | 9/1992 | Prince et al. |
| 5,252,950 A | 10/1993 | Saunders et al. |
| 5,309,169 A | 5/1994 | Leppert |
| 5,359,444 A | 10/1994 | Piosenka et al. |
| 5,453,877 A | 9/1995 | Gerbe et al. |
| 5,455,458 A | 10/1995 | Quon et al. |
| 5,455,601 A | 10/1995 | Ozaki |
| 5,455,882 A | 10/1995 | Veligdan |
| 5,459,611 A | 10/1995 | Bohn et al. |
| 5,483,307 A | 1/1996 | Anderson |
| 5,491,580 A | 2/1996 | O'Meara |
| 5,543,588 A | 8/1996 | Bisset et al. |
| 5,574,473 A | 11/1996 | Sekiguchi |
| 5,579,830 A | 12/1996 | Giammaruti |
| 5,583,609 A | 12/1996 | Mizutani et al. |
| 5,606,455 A | 2/1997 | Eichenlaub |
| 5,614,941 A | 3/1997 | Hines |
| 5,648,643 A | 7/1997 | Knowles et al. |
| 5,651,414 A | 7/1997 | Suzuki et al. |
| 5,673,146 A | 9/1997 | Kelly |
| 5,708,449 A | 1/1998 | Heacock et al. |
| 5,714,967 A | 2/1998 | Okamura et al. |
| 5,737,171 A | 4/1998 | Buller et al. |
| 5,751,476 A | 5/1998 | Matsui et al. |
| 5,771,320 A | 6/1998 | Stone |
| 5,777,715 A | 7/1998 | Kruegle et al. |
| 5,856,842 A | 1/1999 | Tedesco |
| 5,861,931 A | 1/1999 | Gillian et al. |
| 5,886,822 A * | 3/1999 | Spitzer .................. 359/630 |
| 5,940,149 A | 8/1999 | Vanderwerf |
| 5,959,664 A | 9/1999 | Woodgate |
| 5,982,553 A | 11/1999 | Bloom et al. |
| 5,991,087 A | 11/1999 | Rallison |
| 6,101,008 A | 8/2000 | Popovich |
| 6,144,439 A | 11/2000 | Carollo |
| 6,160,667 A | 12/2000 | Smoot |
| 6,188,427 B1 | 2/2001 | Anderson et al. |
| 6,226,178 B1 | 5/2001 | Broder et al. |
| 6,239,502 B1 | 5/2001 | Grewe et al. |
| 6,264,787 B1 | 7/2001 | Burbank |
| 6,271,808 B1 | 8/2001 | Corbin |
| 6,307,142 B1 | 10/2001 | Allen et al. |
| 6,323,970 B1 | 11/2001 | Popovich |
| 6,377,401 B1 | 4/2002 | Bartlett |
| 6,411,512 B1 | 6/2002 | Mankaruse et al. |
| 6,446,442 B1 | 9/2002 | Batchelor et al. |
| 6,466,198 B1 | 10/2002 | Feinstein |
| 6,470,289 B1 | 10/2002 | Peters et al. |
| 6,481,851 B1 | 11/2002 | McNelley et al. |
| 6,496,218 B2 | 12/2002 | Takigawa et al. |
| 6,525,847 B2 * | 2/2003 | Popovich ............ G02B 5/32 359/15 |
| 6,529,331 B2 | 3/2003 | Massof et al. |
| 6,542,307 B2 | 4/2003 | Gleckman et al. |
| 6,545,650 B1 | 4/2003 | Yamada et al. |
| 6,547,416 B2 | 4/2003 | Pashley et al. |
| 6,554,428 B2 | 4/2003 | Fergason et al. |
| 6,567,101 B1 | 5/2003 | Thomas |
| 6,577,411 B1 | 6/2003 | David |
| 6,580,529 B1 | 6/2003 | Amitai et al. |
| 6,606,152 B2 | 8/2003 | Littau |
| 6,621,702 B2 | 9/2003 | Elias et al. |
| 6,631,755 B1 | 10/2003 | Kung et al. |
| 6,635,999 B2 | 10/2003 | Belliveau |
| 6,639,201 B2 | 10/2003 | Almogy et al. |
| 6,735,499 B2 | 5/2004 | Ohki et al. |
| 6,753,828 B2 | 6/2004 | Tuceryan et al. |
| 6,775,460 B2 | 8/2004 | Steiner et al. |
| 6,804,115 B2 | 10/2004 | Lai |
| 6,809,925 B1 | 10/2004 | Belady et al. |
| 6,825,987 B2 | 11/2004 | Repetto et al. |
| 6,829,095 B2 | 12/2004 | Amitai |
| 6,867,753 B2 | 3/2005 | Chinthammit et al. |
| 6,888,613 B2 | 5/2005 | Robins et al. |
| 6,889,755 B2 | 5/2005 | Zuo et al. |
| 6,906,901 B1 | 6/2005 | Liu |
| 6,919,867 B2 | 7/2005 | Sauer |
| 6,947,020 B2 | 9/2005 | Kiser et al. |
| 6,964,731 B1 | 11/2005 | Krisko et al. |
| 6,971,443 B2 | 12/2005 | Kung et al. |
| 6,992,738 B2 | 1/2006 | Ishihara et al. |
| 6,997,241 B2 | 2/2006 | Chou et al. |
| 7,006,215 B2 | 2/2006 | Hoff et al. |
| 7,015,876 B1 | 3/2006 | Miller |
| 7,048,385 B2 | 5/2006 | Beeson et al. |
| 7,069,975 B1 | 7/2006 | Haws et al. |
| 7,113,605 B2 | 9/2006 | Rui et al. |
| 7,116,555 B2 | 10/2006 | Kamath et al. |
| 7,184,615 B2 | 2/2007 | Levola |
| 7,191,820 B2 | 3/2007 | Chou et al. |
| 7,193,584 B2 | 3/2007 | Lee et al. |
| 7,250,930 B2 | 7/2007 | Hoffman et al. |
| 7,261,453 B2 | 8/2007 | Morejon et al. |
| 7,271,795 B2 | 9/2007 | Bradski |
| 7,277,282 B2 | 10/2007 | Tate |
| 7,301,587 B2 | 11/2007 | Uehara et al. |
| 7,337,018 B2 | 2/2008 | Espinoza-Ibarra et al. |
| 7,359,420 B2 | 4/2008 | Shchegrov et al. |
| 7,365,734 B2 | 4/2008 | Fateh et al. |
| 7,369,101 B2 | 5/2008 | Sauer et al. |
| 7,376,852 B2 | 5/2008 | Edwards |
| 7,396,133 B2 | 7/2008 | Burnett et al. |
| 7,412,306 B2 | 8/2008 | Katoh et al. |
| 7,416,017 B2 | 8/2008 | Haws et al. |
| 7,417,617 B2 | 8/2008 | Eichenlaub |
| 7,418,170 B2 | 8/2008 | Mukawa et al. |
| 7,428,001 B2 | 9/2008 | Schowengerdt et al. |
| 7,430,349 B2 | 9/2008 | Jones |
| 7,430,355 B2 | 9/2008 | Heikenfeld et al. |
| 7,455,102 B2 | 11/2008 | Cheng |
| 7,505,269 B1 | 3/2009 | Cosley et al. |
| 7,513,627 B2 | 4/2009 | Larson et al. |
| 7,515,143 B2 | 4/2009 | Keam et al. |
| 7,542,665 B2 | 6/2009 | Lei |
| 7,551,814 B1 | 6/2009 | Smits |
| 7,576,916 B2 | 8/2009 | Amitai |
| 7,583,327 B2 | 9/2009 | Takatani |
| 7,607,111 B2 | 10/2009 | Vaananen et al. |
| 7,619,895 B1 | 11/2009 | Wertz et al. |
| 7,631,687 B2 | 12/2009 | Yang |
| 7,646,606 B2 | 1/2010 | Rytka et al. |
| 7,649,594 B2 | 1/2010 | Kim et al. |
| 7,660,500 B2 | 2/2010 | Konttinen et al. |
| 7,679,641 B2 | 3/2010 | Lipton et al. |
| 7,693,292 B1 | 4/2010 | Gross et al. |
| 7,701,716 B2 | 4/2010 | Blanco, Jr. et al. |
| 7,719,769 B2 | 5/2010 | Sugihara et al. |
| 7,768,534 B2 | 8/2010 | Pentenrieder et al. |
| 7,777,944 B2 | 8/2010 | Ho et al. |
| 7,817,104 B2 | 10/2010 | Ryu et al. |
| 7,832,885 B2 | 11/2010 | Hsiao et al. |
| 7,843,691 B2 | 11/2010 | Reichert et al. |
| 7,868,300 B2 | 1/2011 | Kruit et al. |
| 7,894,613 B1 | 2/2011 | Ong et al. |
| 7,903,409 B2 | 3/2011 | Patel et al. |
| 7,909,958 B2 | 3/2011 | Washburn et al. |
| 7,941,231 B1 | 5/2011 | Dunn |
| 7,986,462 B2 | 7/2011 | Kobayashi et al. |
| 8,004,621 B2 | 8/2011 | Woodgate et al. |
| 8,033,709 B2 | 10/2011 | Kao et al. |
| 8,046,616 B2 | 10/2011 | Edwards |
| 8,061,411 B2 | 11/2011 | Xu et al. |
| 8,085,948 B2 | 12/2011 | Thomas et al. |
| 8,092,064 B2 | 1/2012 | Erchak et al. |
| 8,125,579 B2 | 2/2012 | Khan et al. |
| 8,160,411 B2 | 4/2012 | Levola et al. |
| 8,195,220 B2 | 6/2012 | Kim et al. |
| 8,233,204 B1 * | 7/2012 | Robbins et al. ............ 359/15 |
| 8,233,273 B2 | 7/2012 | Chen et al. |
| 8,246,170 B2 | 8/2012 | Yamamoto et al. |
| 8,274,614 B2 | 9/2012 | Yokote et al. |
| 8,384,999 B1 | 2/2013 | Crosby et al. |
| 8,392,035 B2 | 3/2013 | Patel et al. |
| 8,395,898 B1 | 3/2013 | Chamseddine et al. |

(56) References Cited

U.S. PATENT DOCUMENTS

| | | |
|---|---|---|
| 8,418,083 B1 | 4/2013 | Lundy et al. |
| 8,446,340 B2 | 5/2013 | Aharoni |
| 8,472,119 B1 | 6/2013 | Kelly |
| 8,482,920 B2 | 7/2013 | Tissot et al. |
| 8,576,143 B1 | 11/2013 | Kelly |
| 8,611,014 B2 | 12/2013 | Valera et al. |
| 8,629,815 B2 | 1/2014 | Brin et al. |
| 8,638,498 B2 | 1/2014 | Bohn et al. |
| 8,645,871 B2 | 2/2014 | Fong et al. |
| 8,666,212 B1 | 3/2014 | Amirparviz |
| 8,712,598 B2 | 4/2014 | Dighde et al. |
| 8,754,831 B2 | 6/2014 | Kollin et al. |
| 8,770,813 B2 | 7/2014 | Bohn et al. |
| 8,810,600 B2 | 8/2014 | Bohn et al. |
| 8,817,350 B1 | 8/2014 | Robbins et al. |
| 8,823,531 B1 | 9/2014 | McCleary et al. |
| 8,854,802 B2 | 10/2014 | Robinson et al. |
| 8,909,384 B1 | 12/2014 | Beitelmal et al. |
| 8,917,453 B2 | 12/2014 | Bohn |
| 8,934,235 B2 | 1/2015 | Rubenstein et al. |
| 8,941,683 B2 | 1/2015 | Son et al. |
| 8,989,535 B2 | 3/2015 | Robbins |
| 9,052,414 B2 | 6/2015 | Travis et al. |
| 9,223,138 B2 | 12/2015 | Bohn |
| 9,272,338 B2 | 3/2016 | Fujita et al. |
| 9,297,996 B2 | 3/2016 | Bohn et al. |
| 9,298,012 B2 | 3/2016 | Bohn et al. |
| 9,368,546 B2 | 6/2016 | Fleck et al. |
| 9,558,590 B2 | 1/2017 | Westerinen et al. |
| 9,578,318 B2 | 2/2017 | Fleck et al. |
| 9,581,820 B2 | 2/2017 | Robbins |
| 9,684,174 B2 | 6/2017 | Fleck et al. |
| 9,717,981 B2 | 8/2017 | Robbins et al. |
| 9,726,887 B2 | 8/2017 | Fleck et al. |
| 9,779,643 B2 | 10/2017 | Bohn et al. |
| 9,807,381 B2 | 10/2017 | Flek et al. |
| 2001/0043208 A1 | 11/2001 | Furness, III et al. |
| 2002/0015110 A1 | 2/2002 | Brown Elliott |
| 2002/0041735 A1 | 4/2002 | Cai et al. |
| 2002/0044152 A1 | 4/2002 | Abbott et al. |
| 2002/0044162 A1 | 4/2002 | Sawatari |
| 2002/0063820 A1 | 5/2002 | Broer et al. |
| 2002/0097558 A1 | 7/2002 | Stone et al. |
| 2002/0171939 A1 | 11/2002 | Song |
| 2002/0180659 A1 | 12/2002 | Takahashi |
| 2003/0006364 A1 | 1/2003 | Katzir et al. |
| 2003/0023889 A1 | 1/2003 | Hofstee et al. |
| 2003/0137706 A1 | 7/2003 | Rmanujam et al. |
| 2003/0179453 A1 | 9/2003 | Mori et al. |
| 2004/0011503 A1 | 1/2004 | Kung et al. |
| 2004/0012341 A1 | 1/2004 | Hyuga |
| 2004/0085649 A1 | 5/2004 | Repetto et al. |
| 2004/0108971 A1 | 6/2004 | Waldern et al. |
| 2004/0109234 A1 | 6/2004 | Levola |
| 2004/0135209 A1 | 7/2004 | Hsieh et al. |
| 2004/0195963 A1 | 10/2004 | Choi et al. |
| 2004/0267990 A1 | 12/2004 | Lin |
| 2005/0174737 A1 | 8/2005 | Meir |
| 2005/0179372 A1 | 8/2005 | Kawakami et al. |
| 2005/0207120 A1 | 9/2005 | Tseng et al. |
| 2005/0225233 A1 | 10/2005 | Boroson et al. |
| 2005/0243107 A1 | 11/2005 | Haim et al. |
| 2005/0248705 A1 | 11/2005 | Smith et al. |
| 2005/0285878 A1 | 12/2005 | Singh et al. |
| 2005/0285879 A1 | 12/2005 | Suzuki et al. |
| 2005/0286125 A1 | 12/2005 | Sundstrom et al. |
| 2006/0018025 A1 | 1/2006 | Sharon et al. |
| 2006/0032616 A1 | 2/2006 | Yang |
| 2006/0038881 A1 | 2/2006 | Starkweather et al. |
| 2006/0044399 A1 | 3/2006 | Fredlund et al. |
| 2006/0054787 A1 | 3/2006 | Olsen et al. |
| 2006/0072206 A1 | 4/2006 | Tsuyuki et al. |
| 2006/0118280 A1 | 6/2006 | Liu |
| 2006/0129951 A1 | 6/2006 | Vaananen et al. |
| 2006/0132914 A1 | 6/2006 | Weiss et al. |
| 2006/0139447 A1 | 6/2006 | Unkrich |
| 2006/0152646 A1 | 7/2006 | Schrader |
| 2006/0164382 A1 | 7/2006 | Kulas et al. |
| 2006/0196643 A1 | 9/2006 | Hata et al. |
| 2006/0215244 A1 | 9/2006 | Yosha et al. |
| 2006/0221448 A1 | 10/2006 | Nivon et al. |
| 2006/0228073 A1 | 10/2006 | Mukawa et al. |
| 2006/0249765 A1 | 11/2006 | Hsieh |
| 2007/0002412 A1 | 1/2007 | Aihara |
| 2007/0008456 A1 | 1/2007 | Lesage et al. |
| 2007/0023703 A1 | 2/2007 | Sunaoshi et al. |
| 2007/0027591 A1 | 2/2007 | Goldenberg et al. |
| 2007/0041684 A1 | 2/2007 | Popovich |
| 2007/0097019 A1 | 5/2007 | Wynne-Powell et al. |
| 2007/0147673 A1 | 6/2007 | Crandall |
| 2007/0153395 A1 | 7/2007 | Repetto et al. |
| 2007/0164988 A1 | 7/2007 | Ryu et al. |
| 2007/0177260 A1 | 8/2007 | Kuppenheimer et al. |
| 2007/0236959 A1 | 10/2007 | Tolbert |
| 2007/0284093 A1 | 12/2007 | Bhatti et al. |
| 2008/0007511 A1 | 1/2008 | Tsuboi et al. |
| 2008/0043100 A1 | 2/2008 | Sobel et al. |
| 2008/0043425 A1 | 2/2008 | Hebert et al. |
| 2008/0088603 A1 | 4/2008 | Eliasson et al. |
| 2008/0088624 A1 | 4/2008 | Long et al. |
| 2008/0106677 A1 | 5/2008 | Kuan et al. |
| 2008/0117341 A1 | 5/2008 | McGrew |
| 2008/0141681 A1 | 6/2008 | Arnold |
| 2008/0150913 A1 | 6/2008 | Bell et al. |
| 2008/0174735 A1 | 7/2008 | Quach et al. |
| 2008/0232680 A1 | 9/2008 | Berestov et al. |
| 2008/0248852 A1 | 10/2008 | Rasmussen |
| 2008/0280682 A1 | 11/2008 | Brunner et al. |
| 2008/0285140 A1* | 11/2008 | Amitai .......................... 359/630 |
| 2008/0297535 A1 | 12/2008 | Reinig |
| 2008/0303918 A1 | 12/2008 | Keithley |
| 2008/0311386 A1 | 12/2008 | Wendt |
| 2009/0002939 A1 | 1/2009 | Baugh et al. |
| 2009/0015742 A1 | 1/2009 | Liao et al. |
| 2009/0021908 A1 | 1/2009 | Patel et al. |
| 2009/0051283 A1 | 2/2009 | Cok et al. |
| 2009/0084525 A1 | 4/2009 | Satou et al. |
| 2009/0084757 A1 | 4/2009 | Erokhin et al. |
| 2009/0092261 A1 | 4/2009 | Bard |
| 2009/0097127 A1 | 4/2009 | Amitai |
| 2009/0115783 A1 | 5/2009 | Eichenlaub |
| 2009/0128449 A1 | 5/2009 | Brown et al. |
| 2009/0128901 A1 | 5/2009 | Tilleman et al. |
| 2009/0180250 A1 | 7/2009 | Holling et al. |
| 2009/0189974 A1 | 7/2009 | Deering |
| 2009/0190003 A1 | 7/2009 | Park et al. |
| 2009/0195756 A1 | 8/2009 | Li et al. |
| 2009/0222147 A1 | 9/2009 | Nakashima et al. |
| 2009/0244413 A1 | 10/2009 | Ishikawa et al. |
| 2009/0246707 A1 | 10/2009 | Li et al. |
| 2009/0256837 A1 | 10/2009 | Deb et al. |
| 2009/0262419 A1 | 10/2009 | Robinson et al. |
| 2010/0002989 A1 | 1/2010 | Tokushima |
| 2010/0018858 A1 | 1/2010 | Seki |
| 2010/0021108 A1 | 1/2010 | Kang et al. |
| 2010/0053151 A1 | 3/2010 | Marti et al. |
| 2010/0060551 A1 | 3/2010 | Sugiyama et al. |
| 2010/0061078 A1 | 3/2010 | Kim |
| 2010/0084674 A1 | 4/2010 | Paetzold et al. |
| 2010/0096617 A1 | 4/2010 | Shanks |
| 2010/0103078 A1 | 4/2010 | Mukawa et al. |
| 2010/0134534 A1 | 6/2010 | Seesselberg et al. |
| 2010/0141905 A1 | 6/2010 | Burke |
| 2010/0149073 A1 | 6/2010 | Chaum et al. |
| 2010/0188353 A1 | 7/2010 | Yoon et al. |
| 2010/0200736 A1 | 8/2010 | Laycock et al. |
| 2010/0201953 A1 | 8/2010 | Freeman et al. |
| 2010/0213467 A1 | 8/2010 | Lee et al. |
| 2010/0220439 A1 | 9/2010 | Qin |
| 2010/0229853 A1 | 9/2010 | Vandal et al. |
| 2010/0238270 A1 | 9/2010 | Bjelkhagen et al. |
| 2010/0238664 A1 | 9/2010 | Theodorus et al. |
| 2010/0245387 A1 | 9/2010 | Bachelder et al. |
| 2010/0259889 A1 | 10/2010 | Chen et al. |

(56) References Cited

U.S. PATENT DOCUMENTS

| | | |
|---|---|---|
| 2010/0271467 A1 | 10/2010 | Akeley |
| 2010/0277421 A1 | 11/2010 | Charlier et al. |
| 2010/0277439 A1 | 11/2010 | Charlier et al. |
| 2010/0277779 A1 | 11/2010 | Futterer et al. |
| 2010/0281439 A1 | 11/2010 | Markovic et al. |
| 2010/0287485 A1 | 11/2010 | Bertolami et al. |
| 2010/0300654 A1 | 12/2010 | Edwards |
| 2010/0309687 A1 | 12/2010 | Sampsell et al. |
| 2010/0315781 A1 | 12/2010 | Agostini |
| 2010/0317132 A1 | 12/2010 | Rogers et al. |
| 2010/0321609 A1 | 12/2010 | Qi et al. |
| 2010/0328351 A1 | 12/2010 | Tan |
| 2011/0012814 A1 | 1/2011 | Tanaka |
| 2011/0021251 A1 | 1/2011 | Lindén |
| 2011/0025605 A1 | 2/2011 | Kwitek |
| 2011/0032482 A1 | 2/2011 | Agurok |
| 2011/0050547 A1 | 3/2011 | Mukawa |
| 2011/0050655 A1 | 3/2011 | Mukawa |
| 2011/0051660 A1 | 3/2011 | Arora et al. |
| 2011/0063795 A1 | 3/2011 | Yeh et al. |
| 2011/0068699 A1 | 3/2011 | Knapp |
| 2011/0075442 A1 | 3/2011 | Chiang |
| 2011/0084893 A1 | 4/2011 | Lee et al. |
| 2011/0090343 A1 | 4/2011 | Alt et al. |
| 2011/0091156 A1 | 4/2011 | Laughlin |
| 2011/0110728 A1 | 5/2011 | Kim |
| 2011/0114823 A1 | 5/2011 | Katzir et al. |
| 2011/0127024 A1 | 6/2011 | Patel et al. |
| 2011/0134017 A1 | 6/2011 | Burke |
| 2011/0134645 A1 | 6/2011 | Hitchcock et al. |
| 2011/0141388 A1 | 6/2011 | Park et al. |
| 2011/0148931 A1 | 6/2011 | Kim |
| 2011/0149201 A1 | 6/2011 | Powell et al. |
| 2011/0163986 A1 | 7/2011 | Lee et al. |
| 2011/0194029 A1 | 8/2011 | Herrmann et al. |
| 2011/0205251 A1 | 8/2011 | Auld |
| 2011/0210946 A1 | 9/2011 | Goertz et al. |
| 2011/0214082 A1 | 9/2011 | Osterhout et al. |
| 2011/0215349 A1 | 9/2011 | An et al. |
| 2011/0221658 A1 | 9/2011 | Haddick et al. |
| 2011/0221659 A1 | 9/2011 | King et al. |
| 2011/0222236 A1 | 9/2011 | Luo et al. |
| 2011/0227820 A1 | 9/2011 | Haddick et al. |
| 2011/0227913 A1 | 9/2011 | Hyndman |
| 2011/0242145 A1 | 10/2011 | Nishimura et al. |
| 2011/0242392 A1 | 10/2011 | Chiang |
| 2011/0242757 A1 | 10/2011 | Tracy et al. |
| 2011/0248904 A1 | 10/2011 | Miyawaki et al. |
| 2011/0248958 A1 | 10/2011 | Gruhlke et al. |
| 2011/0267799 A1 | 11/2011 | Epstein et al. |
| 2011/0283223 A1 | 11/2011 | Vaittinen et al. |
| 2011/0299044 A1 | 12/2011 | Yeh et al. |
| 2011/0304640 A1 | 12/2011 | Noge |
| 2011/0309378 A1 | 12/2011 | Lau et al. |
| 2011/0310232 A1 | 12/2011 | Wilson et al. |
| 2011/0310312 A1 | 12/2011 | Yokote et al. |
| 2012/0010487 A1 | 1/2012 | Currie et al. |
| 2012/0013651 A1 | 1/2012 | Trayner et al. |
| 2012/0019434 A1 | 1/2012 | Kuhlman et al. |
| 2012/0026161 A1 | 2/2012 | Chen et al. |
| 2012/0033306 A1 | 2/2012 | Valera et al. |
| 2012/0038629 A1 | 2/2012 | Brown et al. |
| 2012/0041721 A1 | 2/2012 | Chen |
| 2012/0050144 A1 | 3/2012 | Morlock et al. |
| 2012/0052934 A1 | 3/2012 | Maharbiz et al. |
| 2012/0062998 A1 | 3/2012 | Schultz et al. |
| 2012/0069413 A1 | 3/2012 | Schultz |
| 2012/0083325 A1 | 4/2012 | Heatherly |
| 2012/0102438 A1 | 4/2012 | Robinson et al. |
| 2012/0105487 A1 | 5/2012 | Son et al. |
| 2012/0106170 A1 | 5/2012 | Matthews et al. |
| 2012/0111544 A1 | 5/2012 | Senatori |
| 2012/0113092 A1* | 5/2012 | Bar-Zeev et al. ............ 345/419 |
| 2012/0127577 A1 | 5/2012 | Desserouer |
| 2012/0157114 A1 | 6/2012 | Alameh et al. |
| 2012/0162764 A1 | 6/2012 | Shimizu |
| 2012/0176474 A1 | 7/2012 | Border |
| 2012/0182687 A1 | 7/2012 | Dighde et al. |
| 2012/0188205 A1 | 7/2012 | Jansson et al. |
| 2012/0200495 A1 | 8/2012 | Johansson |
| 2012/0206589 A1 | 8/2012 | Crandall |
| 2012/0206880 A1 | 8/2012 | Andres et al. |
| 2012/0218301 A1 | 8/2012 | Miller |
| 2012/0227006 A1 | 9/2012 | Amm |
| 2012/0235885 A1 | 9/2012 | Miller et al. |
| 2012/0242561 A1 | 9/2012 | Sugihara |
| 2012/0242798 A1 | 9/2012 | Mcardle et al. |
| 2012/0249797 A1 | 10/2012 | Haddick et al. |
| 2012/0256856 A1 | 10/2012 | Suzuki et al. |
| 2012/0256963 A1 | 10/2012 | Suzuki et al. |
| 2012/0287381 A1 | 11/2012 | Li et al. |
| 2012/0292535 A1 | 11/2012 | Choi et al. |
| 2013/0000871 A1 | 1/2013 | Olson et al. |
| 2013/0027772 A1 | 1/2013 | Large |
| 2013/0033485 A1 | 2/2013 | Kollin et al. |
| 2013/0081779 A1 | 4/2013 | Liao et al. |
| 2013/0093741 A1 | 4/2013 | Akimoto et al. |
| 2013/0106674 A1 | 5/2013 | Wheeler et al. |
| 2013/0155070 A1 | 6/2013 | Luo |
| 2013/0162673 A1 | 6/2013 | Bohn |
| 2013/0163089 A1 | 6/2013 | Bohn |
| 2013/0170031 A1 | 7/2013 | Bohn |
| 2013/0186596 A1 | 7/2013 | Rubenstein |
| 2013/0186598 A1 | 7/2013 | Rubenstein |
| 2013/0187943 A1 | 7/2013 | Bohn et al. |
| 2013/0201285 A1 | 8/2013 | Mao et al. |
| 2013/0207896 A1 | 8/2013 | Robinson et al. |
| 2013/0207964 A1 | 8/2013 | Fleck |
| 2013/0208003 A1 | 8/2013 | Bohn |
| 2013/0208362 A1 | 8/2013 | Bohn |
| 2013/0208482 A1 | 8/2013 | Fleck |
| 2013/0215081 A1 | 8/2013 | Levin et al. |
| 2013/0242056 A1 | 9/2013 | Fleck |
| 2013/0242555 A1 | 9/2013 | Mukawa |
| 2013/0249895 A1 | 9/2013 | Westerinen et al. |
| 2013/0250431 A1 | 9/2013 | Robbins et al. |
| 2013/0252628 A1 | 9/2013 | Kuehnel |
| 2013/0257848 A1 | 10/2013 | Westerinen et al. |
| 2013/0258701 A1 | 10/2013 | Westerinen et al. |
| 2013/0267309 A1 | 10/2013 | Robbins |
| 2013/0294030 A1 | 11/2013 | Wang et al. |
| 2013/0307875 A1 | 11/2013 | Anderson |
| 2013/0314793 A1 | 11/2013 | Robbins et al. |
| 2013/0322810 A1 | 12/2013 | Robbins |
| 2013/0332159 A1 | 12/2013 | Federighi et al. |
| 2013/0335671 A1 | 12/2013 | Fleck |
| 2013/0342674 A1 | 12/2013 | Dixon |
| 2014/0010265 A1 | 1/2014 | Peng |
| 2014/0041827 A1 | 2/2014 | Giaimo |
| 2014/0078130 A1 | 3/2014 | Uchino et al. |
| 2014/0094973 A1 | 4/2014 | Giaimo et al. |
| 2014/0104665 A1 | 4/2014 | Popovich et al. |
| 2014/0104685 A1 | 4/2014 | Bohn |
| 2014/0111865 A1 | 4/2014 | Kobayashi |
| 2014/0140653 A1 | 5/2014 | Brown et al. |
| 2014/0140654 A1 | 5/2014 | Brown et al. |
| 2014/0176528 A1 | 6/2014 | Robbins |
| 2014/0184699 A1 | 7/2014 | Ito et al. |
| 2014/0204455 A1 | 7/2014 | Popovich |
| 2014/0240842 A1 | 8/2014 | Nguyen et al. |
| 2014/0320399 A1 | 10/2014 | Kim et al. |
| 2015/0168731 A1 | 6/2015 | Robbins |
| 2015/0227231 A1 | 8/2015 | Chen |
| 2016/0033697 A1 | 2/2016 | Sainiema et al. |
| 2016/0035539 A1 | 2/2016 | Sainiema et al. |
| 2016/0231570 A1 | 8/2016 | Levola et al. |
| 2016/0234485 A1 | 8/2016 | Robbins et al. |
| 2016/0282625 A1 | 9/2016 | Fleck et al. |
| 2017/0140577 A1 | 5/2017 | Westerinen et al. |
| 2017/0163977 A1 | 6/2017 | Fleck et al. |

(56) References Cited

U.S. PATENT DOCUMENTS

| | | | |
|---|---|---|---|
| 2017/0301270 | A1 | 10/2017 | Bohn et al. |
| 2017/0326446 | A1 | 11/2017 | Robbins et al. |

FOREIGN PATENT DOCUMENTS

| | | | |
|---|---|---|---|
| CN | 1714326 | A | 12/2005 |
| CN | 101029968 | | 9/2007 |
| CN | 101589326 | | 11/2009 |
| CN | 201491069 | | 5/2010 |
| CN | 101881936 | | 11/2010 |
| CN | 102004315 | | 4/2011 |
| CN | 102096235 | A | 6/2011 |
| CN | 102156555 | | 8/2011 |
| DE | 102007021036 | | 11/2008 |
| EP | 0977022 | | 2/2000 |
| EP | 1494109 | | 1/2005 |
| EP | 1748370 | A1 | 1/2007 |
| EP | 2065750 | | 6/2009 |
| EP | 2112547 | | 10/2009 |
| EP | 2216678 | | 1/2010 |
| EP | 2700987 | | 2/2014 |
| EP | 3018524 | | 5/2016 |
| JP | H02227340 | | 9/1990 |
| JP | H0422358 | | 1/1992 |
| JP | 7311303 | | 11/1995 |
| JP | H08163602 | | 6/1996 |
| JP | H08190640 | | 7/1996 |
| JP | 2000013818 | | 1/2000 |
| JP | 2000276613 | A | 10/2000 |
| JP | 2001078234 | | 3/2001 |
| JP | 2002358032 | A | 12/2002 |
| JP | 2002365589 | | 12/2002 |
| JP | 2003005128 | | 1/2003 |
| JP | 2004219664 | | 8/2004 |
| JP | 2005172851 | | 6/2005 |
| JP | 2005309638 | | 11/2005 |
| JP | 2006195333 | | 7/2006 |
| JP | 2006267887 | | 10/2006 |
| JP | 2006349921 | | 12/2006 |
| JP | 2008015125 | | 1/2008 |
| JP | 2008017135 | | 1/2008 |
| JP | 2008097599 | | 4/2008 |
| JP | 2008518368 | | 5/2008 |
| JP | 2009187290 | A | 8/2009 |
| JP | 201061545 | | 3/2010 |
| JP | 2012042654 | | 3/2012 |
| KR | 20090076539 | | 7/2009 |
| KR | 20110070087 | | 6/2011 |
| KR | 20120023458 | | 3/2012 |
| TW | 200846700 | | 12/2008 |
| WO | WO-9418595 | | 8/1994 |
| WO | WO-2001033282 | | 5/2001 |
| WO | WO-0195027 | | 12/2001 |
| WO | WO-03090611 | | 11/2003 |
| WO | WO-2006054056 | | 5/2006 |
| WO | WO-2008021504 | | 2/2008 |
| WO | WO-2009077601 | | 6/2009 |
| WO | WO-2010125337 | | 11/2010 |
| WO | WO-2011003381 | | 1/2011 |
| WO | WO-2011041466 | | 4/2011 |
| WO | WO 2011051660 | A1 * | 5/2011 |
| WO | WO-2011090455 | | 7/2011 |
| WO | 2011106797 | A1 | 9/2011 |
| WO | WO-2011110728 | | 9/2011 |
| WO | WO-2011131978 | | 10/2011 |
| WO | WO-2012172295 | | 12/2012 |
| WO | 2013093906 | A1 | 6/2013 |
| WO | WO-2013164665 | | 11/2013 |
| WO | WO-2014130383 | | 8/2014 |

OTHER PUBLICATIONS

"Advisory Action", U.S. Appl. No. 13/428,879, dated Sep. 19, 2014, 3 pages.

"Augmented Reality and Physical Games", U.S. Appl. No. 13/440,165, filed Apr. 5, 2012, 49 pages.

"BragGrate Mirror", Retrieved from <http://web.archive.org/web/20090814104232/http://www.optigrate.com/BragGrate_Mirror.html> on Jul. 8, 2014, Aug. 14, 2009, 2 pages.

"Corrected Final Office Action", U.S. Appl. No. 13/432,311, dated Dec. 24, 2014, 25 pages.

"Corrected Notice of Allowance", U.S. Appl. No. 13/355,836, dated Sep. 11, 2014, 2 pages.

"Corrected Notice of Allowance", U.S. Appl. No. 13/355,836, dated Dec. 15, 2014, 2 pages.

"DigiLens", SBG Labs, retrieved from <http://www.digilens.com/products.html> on Jun. 19, 2012, 1 page.

"Final Office Action", U.S. Appl. No. 13/336,873, dated Jan. 5, 2015, 21 pages.

"Final Office Action", U.S. Appl. No. 13/336,895, dated May 27, 2014, 11 pages.

"Final Office Action", U.S. Appl. No. 13/355,836, dated Mar. 10, 2014, 18 pages.

"Final Office Action", U.S. Appl. No. 13/355,914, dated Feb. 23, 2015, 21 pages.

"Final Office Action", U.S. Appl. No. 13/355,914, dated Jun. 19, 2014, 11 pages.

"Final Office Action", U.S. Appl. No. 13/397,495, dated May 29, 2014, 10 pages.

"Final Office Action", U.S. Appl. No. 13/397,516, dated Jan. 29, 2015, 13 pages.

"Final Office Action", U.S. Appl. No. 13/428,879, dated Jul. 14, 2014, 12 pages.

"Final Office Action", U.S. Appl. No. 13/432,311, dated Dec. 15, 2014, 24 pages.

"Final Office Action", U.S. Appl. No. 13/432,372, dated Jan. 29, 2015, 33 pages.

"Final Office Action", U.S. Appl. No. 13/440,165, dated Jun. 6, 2014, 12 pages.

"Final Office Action", U.S. Appl. No. 13/525,649, dated Oct. 9, 2014, 8 pages.

"Final Office Action", U.S. Appl. No. 14/134,993, dated Aug. 20, 2014, 15 pages.

"Foreign Office Action", CN Application No. 201210563730.3, dated Jan. 7, 2015, 16 pages.

"Foreign Office Action", CN Application No. 201210567932.5, dated Aug. 14, 2014, 12 pages.

"Foreign Office Action", EP Application No. 13769961.7, dated Mar. 11, 2015, 8 pages.

"HDTV Helmet Mounted Display", Available at <http://defense-update.com/products/h/HDTV-HMD.htm>, Jan. 26, 2005, 1 page.

"International Search Report and Written Opinion", Application No. PCT/US2012/069331, dated Mar. 29, 2013, 10 pages.

"International Search Report and Written Opinion", Application No. PCT/US2014/016658, dated Apr. 23, 2014, 10 pages.

"International Search Report and Written Opinion", Application No. PCT/US2013/053676, dated Oct. 16, 2013, 10 pages.

"International Search Report and Written Opinion", Application No. PCT/US2013/030632, dated Jun. 26, 2013, 10 pages.

"International Search Report and Written Opinion", Application No. PCT/US2013/028477, dated Jun. 21, 2013, 11 pages.

"International Search Report and Written Opinion", Application No. PCT/US2013/031111, dated Jun. 26, 2013, 11 pages.

"International Search Report and Written Opinion", Application No. PCT/US2013/076832, dated Mar. 17, 2014, 12 pages.

"International Search Report and Written Opinion", Application No. PCT/US2013/061225, dated Jun. 4, 2014, 12 pages.

"International Search Report and Written Opinion", Application No. PCT/US2012/071563, dated Apr. 25, 2013, 13 pages.

"International Search Report and Written Opinion", Application No. PCT/US2013/021784, dated Apr. 30, 2013, 9 pages.

"International Search Report and Written Opinion", Application No. PCT/US2012/069330, dated Mar. 28, 2013, 9 pages.

"International Search Report and Written Opinion", Application No. PCT/US2013/021783, dated May 15, 2013, 9 pages.

"International Search Report and Written Opinion", Application No. PCT/US2013/026200, dated Jun. 3, 2013, 9 pages.

(56) References Cited

OTHER PUBLICATIONS

"Light Guide Techniques using LED Lamps", Application Brief I-003, retrieved from <http://www.ciri.org.nz/downloads/Lightpipe%20design.pdf> on Jan. 12, 2012, Oct. 14, 2008, 22 pages.
"Non-Final Office Action", U.S. Appl. No. 13/397,495, dated Nov. 13, 2013, 8 pages.
"Non-Final Office Action", U.S. Appl. No. 13/440,165, dated Feb. 6, 2014, 12 pages.
"Non-Final Office Action", U.S. Appl. No. 13/336,873, dated Apr. 9, 2015, 18 pages.
"Non-Final Office Action", U.S. Appl. No. 13/336,873, dated Jul. 25, 2014, 16 pages.
"Non-Final Office Action", U.S. Appl. No. 13/336,895, dated Oct. 24, 2013, 9 pages.
"Non-Final Office Action", U.S. Appl. No. 13/343,675, dated Jul. 16, 2013, 9 pages.
"Non-Final Office Action", U.S. Appl. No. 13/355,836, dated Nov. 4, 2013, 15 pages.
"Non-Final Office Action", U.S. Appl. No. 13/355,914, dated Feb. 14, 2014, 10 pages.
"Non-Final Office Action", U.S. Appl. No. 13/355,914, dated Oct. 28, 2014, 18 pages.
"Non-Final Office Action", U.S. Appl. No. 13/397,495, dated Apr. 3, 2015, 11 pages.
"Non-Final Office Action", U.S. Appl. No. 13/397,516, dated Jun. 12, 2014, 11 pages.
"Non-Final Office Action", U.S. Appl. No. 13/397,516, dated Nov. 25, 2013, 10 pages.
"Non-Final Office Action", U.S. Appl. No. 13/397,539, dated Mar. 16, 2015, 9 pages.
"Non-Final Office Action", U.S. Appl. No. 13/397,617, dated May 5, 2015, 6 pages.
"Non-Final Office Action", U.S. Appl. No. 13/397,617, dated Oct. 9, 2014, 6 pages.
"Non-Final Office Action", U.S. Appl. No. 13/428,879, dated Feb. 24, 2015, 10 pages.
"Non-Final Office Action", U.S. Appl. No. 13/428,879, dated Mar. 17, 2014, 10 pages.
"Non-Final Office Action", U.S. Appl. No. 13/432,311, dated Jul. 8, 2014, 33 pages.
"Non-Final Office Action", U.S. Appl. No. 13/432,372, dated May 9, 2014, 26 pages.
"Non-Final Office Action", U.S. Appl. No. 13/432,372, dated Oct. 24, 2014, 27 pages.
"Non-Final Office Action", U.S. Appl. No. 13/440,165, dated Feb. 13, 2015, 10 pages.
"Non-Final Office Action", U.S. Appl. No. 13/440,165, dated Oct. 16, 2014, 11 pages.
"Non-Final Office Action", U.S. Appl. No. 13/525,649, dated Jan. 29, 2014, 7 pages.
"Non-Final Office Action", U.S. Appl. No. 13/525,649, dated Feb. 5, 2015, 7 pages.
"Non-Final Office Action", U.S. Appl. No. 13/525,649, dated Jun. 5, 2014, 7 pages.
"Non-Final Office Action", U.S. Appl. No. 13/570,073, dated Jan. 23, 2015, 7 pages.
"Non-Final Office Action", U.S. Appl. No. 13/631,308, dated Feb. 23, 2015, 9 pages.
"Non-Final Office Action", U.S. Appl. No. 13/774,875, dated Nov. 24, 2014, 8 pages.
"Non-Final Office Action", U.S. Appl. No. 14/134,993, dated Jan. 22, 2015, 17 pages.
"Non-Final Office Action", U.S. Appl. No. 14/134,993, dated Apr. 17, 2014, 34 pages.
"Notice of Allowance", U.S. Appl. No. 13/336,895, dated Aug. 11, 2014, 6 pages.
"Notice of Allowance", U.S. Appl. No. 13/343,675, dated Sep. 16, 2013, 8 pages.
"Notice of Allowance", U.S. Appl. No. 13/355,836, dated Jun. 13, 2014, 11 pages.
"Notice of Allowance", U.S. Appl. No. 13/355,836, dated Oct. 8, 2014, 11 pages.
"Notice of Allowance", U.S. Appl. No. 13/356,545, dated Mar. 28, 2014, 6 pages.
"Notice of Allowance", U.S. Appl. No. 13/488,145, dated Nov. 19, 2014, 8 pages.
"Restriction Requirement", U.S. Appl. No. 13/355,836, dated Sep. 27, 2013, 6 pages.
"Restriction Requirement", U.S. Appl. No. 13/397,539, dated Dec. 1, 2014, 6 pages.
"Restriction Requirement", U.S. Appl. No. 13/488,145, dated Sep. 8, 2014, 14 pages.
"Restriction Requirement", U.S. Appl. No. 13/570,073, dated Nov. 18, 2014, 7 pages.
"Supplemental Notice of Allowance", U.S. Appl. No. 13/356,545, dated Jul. 22, 2014, 2 pages.
"Supplementary European Search Report", EP Application No. 13769961.7, dated Mar. 3, 2015, 3 pages.
"Two-Faced: Transparent Phone with Dual Touch Screens", Retrieved from <http://gajitz.com/two-faced-transparent-phone-with-dual-touch-screens/>, Jun. 7, 2012, 3 pages.
"Written Opinion", Application No. PCT/US2013/061225, dated Oct. 10, 2014, 6 Pages.
Allen,"ELiXIR—Solid-State Luminaire with Enhanced Light Extraction by Internal Reflection", Journal of Display Technology, vol. 3, No. 2, Available at <http://www.nanolab.uc.edu/Publications/PDFfiles/355.pdf>, Jun. 2007, pp. 155-159.
Aron,"'Sprinting' chips could push phones to the speed limit", New Scientist, Feb. 20, 2012, Issue #2852, Feb. 20, 2012, 2 pages.
Baluja,"Non-Intrusive Gaze Tracking Using Artificial Neural Networks", Technical Report CMU-CS-94-102, Available at <http://citeseerx.ist.psu.edu/viewdoc/download?doi=10.1.1.33.4027&rep=rep1&type=pdf>, Jan. 5, 1994, 14 pages.
Barger,"COTS Cooling", Publication of the National Electronics Manufacturing Center of Excellence, Retrieved from: <http://www.empf.org/empfasis/2009/Oct09/cots.html> on Jul. 9, 2012, Oct. 2009, 4 pages.
Baudisch,"Back-of-Device Interaction Allows Creating Very Small Touch Devices", In Proceedings of 27th International Conference on Human Factors in Computing Systems, Retrieved from <http://citeseerx.ist.psu.edu/viewdoc/download?doi=10.1.1.160.3337&rep=rep1&type=pdf>, Apr. 2005, 10 pages.
Baxtor,"TwinTech GeForce GTS 250 XT OC 1GB Graphics Card", retrieved from <http://www.tweaktown.com/reviews/2733/twintech_geforce_gts_250_xt_oc_1gb_graphic s_card/index3.html> on Dec. 30, 2011, Apr. 24, 2009, 4 pages.
Chen,"Strategies for 3D Video with Wide Fields-of-View", IEEE Proceeding Optoelectronics, vol. 148, Issue 2, Available at <http://ieeexplore.ieee.org/stamp/stamp.jsp?tp=&arnumber=926823>, Apr. 2001, pp. 85-90.
Cheng,"Waveguide Displays Based on Polymer-dispersed Liquid Crystals", SPIE Newsroom, Available at <http://spie.org/documents/Newsroom/Imported/003805/003805_10.pdf>, Aug. 12, 2011, 2 pages.
Chirgwin,"Researchers propose 'overclock' scheme for mobiles—Processing at a sprint to overcome tech limitations", The Register, Feb. 21, 2012, Feb. 21, 2012, 2 pages.
Coldewey,"Researchers Propose "Computational Sprinting" to Speed Up Chips by 1000%—But Only for a Second", TechCrunch, Feb. 28, 2012, Feb. 29, 2012, 2 pages.
DeAgazio,"Selecting Display Backlighting for Portable, Handheld Devices", Hearst Electronics Products, retrieved from <http://www2.electronicproducts.com/Selecting_display backlighting_for_portable_handheld_devices-article-farcglobal-feb2008-html.aspx> on Jan. 12, 2012, Jan. 2, 2008, 4 pages.
Eadicicco,"First Transparent Tablet Lets You Touch From Both Sides", Retrieved from <http://blog.laptopmag.com/first-transparent-tablet>, Dec. 26, 2013, 4 pages.
Greenemeier,"Could "Computational Sprinting" Speed Up Smart Phones without Burning Them Out?", Scientific American, Feb. 29, 2012, Feb. 29, 2012, 2 pages.

(56) References Cited

OTHER PUBLICATIONS

Han,"Accurate diffraction efficiency control for multiplexed volume holographic gratings", Retrieved at: opticalengineering.spiedigitallibrary.org/data/Journals/.../2799_1, 2002, 4 pages.

Hua,"Engineering of Head-mounted Projective Displays", In Proceedings of Applied Optics, vol. 39, No. 22, Aug. 1, 2000, 11 pages.

Jacques,"Polarized Light Imaging of Tissue", Available at <http://www.lumamed.com/documents/5_polarized%20light%20imaging.pdf>, 2004, 17 pages.

Jarvenpaa,"Compact near-to-eye display with integrated gaze tracker", Second International Conference on Computer Engineering and Applications, Mar. 19, 2010, 9 pages.

Jaworski,"A Novel Design of Heat Sink with PCM for Electronics Cooling", 10th International Conference on Thermal Energy Storage, Stockton, May 31-Jun. 2, 2006, retrieved from <https://intraweb.stockton.edu/eyos/energy_studies/content/docs/FINAL_PRESENTATIONS/4b-6%20.pdf> on Jan. 5, 2012, May 31, 2006, 8 pages.

Karp,"Planar Micro-optic Solar Concentration using Multiple Imaging Lenses into a Common Slab Waveguide", In Proceedings of SPIE vol. 7407, Available at <http://psilab.ucsd.edu/research/slab_concentration/files/SPIE_Slab_Published.pdf>, Jan. 2009, 11 pages.

Kress,"Exit Pupil for Wearable See-through displays", Downloaded From: http://proceedings.spiedigitallibrary.org/ on Jan. 31, 2015 Terms of Use: http://spiedl.org/terms, 2012, 8 pages.

Krishnan,"A Novel Hybrid Heat Sink Using Phase Change Materials for Transient Thermal Management of Electronics", IEEE transactions on components and packaging technologies, vol. 28, No. 2, retrieved from <http://ieeexplore.ieee.org/stamp/stamp.jsp?tp=&arnumber=1432936> on Jan. 5, 2012, Jun. 2005, pp. 281-289.

Lanman,"Near-eye Light Field Displays", In Journal of ACM Transactions on Graphics, vol. 32, No. 6, Nov. 2013, 10 pages.

Large,"Parallel Optics in Waveguide Displays: a Flat Panel Autostereoscopic", Display Technology, Journal of, Retrieved from <http://download.microsoft.com/download/D/2/E/D2E425F8-CF3C-4C71-A4A2-70F9D4081007/ParallelOpticsinWaveguideDisplaysMS090925.Final.pdf>, Jun. 21, 2010, pp. 1-7.

Lerner,"Penn Helps Rethink Smartphone Design With 'Computational Sprinting'", Penn News Release, Feb. 28, 2012, 2 pages.

Li,"Design Optimization of Reflective Polarizers for LCD Backlight Recycling", Journal of Display Technology, vol. 5, No. 8, Available at <http://ieeexplore.ieee.org/stamp/stamp.jsp?tp=&arnumber=5196840 >, Aug. 2009, pp. 335-340.

Man,"IT Equipment Noise Emission Standards: Overview of New Development in the Next Edition of ISO/ECMA Standards", In Proceedings of 37th International Congress and Exposition on Noise Control Engineering, Available at <http://www.ecma-international.org/activities/Acoustics/Inter-noise%202008%20paper%20on%20ECMA-74%20updates.pdf >, Oct. 26, 2008, 8 pages.

Massenot,"Multiplexed holographic transmission gratings recorded in holographic polymer-dispersed liquid crystals: static and dynamic studies", Retrieved at: http://oatao.univ-toulouse.fr/2874/, 2005, 8 pages.

McMillan,"Your Future iPhone May Be Stuffed With Wax", Aug. 23, 2013, 3 pages.

Melcher,"LCoS for High Performance Displays", In Proceedings of LEOS 2003, Available at <http://ieeexplore.ieee.org/stamp/stamp.jsp?tp=&arnumber=1253048>, Oct. 27, 2003, pp. 812-813.

Minier,"Diffraction Characteristics of Superimposed Holographic gratings in Planar Optical waveguides", IEEE Photonics Technology Letters, vol. 4, No. 10, Oct. 1992, 4 pages.

Moore,"Computational sprinting pushes smartphones till they're tired", Michigan News Release, Feb. 28, 2012, 2 pages.

Nguyen,"Advanced Cooling System Using Miniature Heat Pipes in Mobile PC", IEEE Transactions on Components and Packaging Technology, vol. 23, No. 1, Available at <http://ieeexplore.ieee.org/stamp/stamp.jsp?tp=&arnumber=833046&userType=inst>, Mar. 2000, pp. 86-90.

Owano,"Study explores computing bursts for smartphones", PhysOrg.com, Feb. 21, 2012, Feb. 21, 2012, 2 pages.

Papaefthymiou,"Computational Sprinting on a Hardware/Software Testbed", In the Proceedings of the 18th Eighteenth International Conference on Architectural Support for Programming Languages and Operating Systems (ASPLOS), Mar. 2013., Mar. 2013, 12 pages.

Patrizio,"Researchers Working on Ways to Put 16-Core Processors in Smartphones", Brighthand, Mar. 18, 2012, Mar. 18, 2012, 2 pages.

Pu,"Exposure schedule for multiplexing holograms in photopolymer films", Retrieved at: lo.epfl.ch/webdav/site/lo/shared/1996/OE_35_2824_Oct1996.pdf, Oct. 1996, 6 pages.

Raghavan,"Computational Sprinting", In the Proceedings of the 18th Symposium on High Performance Computer Architecture (HPCA), Feb. 2012, Feb. 2012, 12 pages.

Raghavan,"Designing for Responsiveness With Computational Sprinting", IEEE Micro's "Top Picks of 2012" Issue, May 2013, 8 pages.

Scott,"RearType: Text Entry Using Keys on the Back of a Device", In Proceedings of 12th Conference on Human-Computer Interaction with Mobile Devices and Services, Retrieved from <https://research.microsoft.com/pubs/135609/reartype%20mobilehci.pdf>, Sep. 7, 2010, 9 pages.

Singh"Laser-Based Head-Tracked 3D Display Research", Journal of Display Technology, vol. 6, No. 10, Available at <http://ieeexplore.ieee.org/stamp/stamp.jsp?tp=&arnumber=5462999>, Oct. 2010, pp. 531-543.

Stupar,"Optimization of Phase Change Material Heat Sinks for Low Duty Cycle High Peak Load Power Supplies", IEEE transactions on components, packaging and manufacturing technology, retrieved from <http://ieeexplore.ieee.org/stamp/stamp.jsp?tp=&arnumber=6081913> on Jan. 5, 2012, Nov. 15, 2011, 14 pages.

Tari,"CFD Analyses of a Notebook Computer Thermal Management System and a Proposed Passive Cooling Alternative", IEEE Transactions on Components and Packaging Technologies, vol. 33, No. 2, retrieved from <http://ieeexplore.ieee.org/stamp/stamp.jsp?tp=&arnumber=5466211> on Dec. 30, 2011, Jun. 2010, pp. 443-452.

Travis,"Collimated Light from a Waveguide for a Display Backlight", Optics Express—Retrieved from <http://download.microsoft.com/download/D/2/E/D2E425F8-CF3C-4C71-A4A2-70F9D4081007/OpticsExpressbacklightpaper.pdf>, Oct. 15, 2009, pp. 19714-19719.

Travis,"The Design of Backlights for View-Sequential 3D", Microsoft Corporation, Available at <http://download.microsoft.com/download/D/2/E/D2E425F8-CF3C-4C71-A4A2-70F9D4081007/Backlightforviewsequentialautostereo.docx>, Jul. 3, 2010, 4 pages.

Van"A Survey of Augmented Reality Technologies, Applications and Limitations", The International Journal of Virtual Reality, 2010, 9(2), Available at <http://www.ijvr.org/issues/issue2-2010/paper1%20.pdf>, Jun. 2010, pp. 1-19.

Walker,"Thermalright Ultra-120 Extreme CPU Cooler", retrieved from <http://www.pro-clockers.com/cooling/66-thermalright-ultra-120-extreme-cpu-cooler.html> on Dec. 30, 2011, Jul. 2, 2009, 7 pages.

Westerinen,"Light Guide Display and Field of View", U.S. Appl. No. 13/428,879, filed Mar. 23, 2012, 46 pages.

Wigdor,"LucidTouch: A See-Through Mobile Device", In Proceedings of 20th Annual ACM symposium on User Interface Software and Technology, Retrieved from <http://dl.acm.org/citation.cfm?id=1294259>, Oct. 7, 2007, 10 pages.

Yan,"Multiplexing holograms in the photopolymer with equal diffraction efficiency", 2005, 9 pages.

Zharkova,"Study of the Dynamics of Transmission Gratings Growth on Holographic Polymer-Dispersed Liquid Crystals", International Conference on Methods of Aerophysical Research, ICMAR 2008, 2008, 4 pages.

"Corrected Notice of Allowance", U.S. Appl. No. 13/336,873, dated Sep. 11, 2015, 4 pages.

"Final Office Action", U.S. Appl. No. 13/397,539, dated Jun. 29, 2015, 11 pages.

"Final Office Action", U.S. Appl. No. 13/440,165, dated Jul. 21, 2015, 11 pages.

"Final Office Action", U.S. Appl. No. 13/774,875, dated Jun. 4, 2015, 10 pages.

(56) References Cited

OTHER PUBLICATIONS

"Final Office Action", U.S. Appl. No. 14/134,993, dated Jul. 16, 2015, 19 pages.
"Foreign Office Action", EP Application No. 13765041.2, dated Aug. 5, 2015, 6 pages.
"Foreign Office Action", EP Application No. 13769961.7, dated Jun. 30, 2015, 6 pages.
"Non-Final Office Action", U.S. Appl. No. 13/428,879, dated Jun. 26, 2015, 13 pages.
"Non-Final Office Action", U.S. Appl. No. 13/432,311, dated Jun. 2, 2015, 25 pages.
"Non-Final Office Action", U.S. Appl. No. 13/722,917, dated May 21, 2015, 12 pages.
"Notice of Allowance", U.S. Appl. No. 13/336,873, dated Jul. 31, 2015, 6 pages.
"Restriction Requirement", U.S. Appl. No. 13/420,388, dated Aug. 13, 2015, 6 pages.
"Supplementary European Search Report", EP Application No. 13765041.2, dated Jul. 21, 2015, 3 pages.
"Corrected Notice of Allowance", U.S. Appl. No. 13/336,873, dated Nov. 27, 2015, 4 pages.
"Final Office Action", U.S. Appl. No. 13/397,617, dated Nov. 18, 2015, 11 pages.
"Final Office Action", U.S. Appl. No. 13/428,879, dated Dec. 10, 2015, 16 pages.
"Final Office Action", U.S. Appl. No. 13/432,311, dated Dec. 18, 2015, 9 pages.
"International Search Report and Written Opinion", Application No. PCT/US2015/041900, dated Oct. 21, 2015, 12 pages.
"International Search Report and Written Opinion", Application No. PCT/US2015/041909, dated Oct. 20, 2015, 13 pages.
"Non-Final Office Action", U.S. Appl. No. 13/420,388, dated Dec. 4, 2015, 7 pages.
"Notice of Allowance", U.S. Appl. No. 14/134,993, dated Nov. 17, 2015, 9 pages.
Ando,"Development of Three-Dimensional Microstages Using Inclined Deep-Reactive Ion Etching", Journal of Microelectromechanical Systems, Jun. 1, 2007, 10 pages.
Gila,"First Results From a Multi-Ion Beam Lithography and Processing System at the University of Florida", AIP Conference Proceedings, Jun. 1, 2011, 6 pages.
"Corrected Notice of Allowance", U.S. Appl. No. 13/397,516, dated May 16, 2016, 2 pages.
"Final Office Action", U.S. Appl. No. 13/397,539, dated Apr. 21, 2016, 14 pages.
"Final Office Action", U.S. Appl. No. 13/420,388, dated Apr. 21, 2016, 9 pages.
"Final Office Action", U.S. Appl. No. 13/722,917, dated Jun. 17, 2016, 19 pages.
"Final Office Action", U.S. Appl. No. 13/774,875, dated Apr. 22, 2016, 10 pages.
"International Search Report and Written Opinion", Application No. PCT/US2016/015496, dated Apr. 11, 2016, 11 pages.
"International Search Report and Written Opinion", Application No. PCT/US2016/015873, dated May 23, 2016, 11 pages.
"Non-Final Office Action", U.S. Appl. No. 13/397,617, dated May 18, 2016, 8 pages.
"Non-Final Office Action", U.S. Appl. No. 14/617,606, dated May 23, 2016, 12 pages.
"Advisory Action", U.S. Appl. No. 13/432,311, dated Mar. 24, 2016, 3 pages.
"Corrected Notice of Allowance", U.S. Appl. No. 13/397,495, dated Mar. 3, 2016, 4 pages.
"Corrected Notice of Allowance", U.S. Appl. No. 13/397,516, dated Mar. 3, 2016, 2 pages.
"Non-Final Office Action", U.S. Appl. No. 13/440,165, dated Mar. 28, 2016, 13 pages.
"Non-Final Office Action", U.S. Appl. No. 13/722,917, dated Feb. 9, 2016, 17 pages.
"Notice of Allowance", U.S. Appl. No. 13/397,516, dated Feb. 1, 2016, 7 pages.
"Supplemental Notice of Allowance", U.S. Appl. No. 13/397,495, dated Jan. 26, 2016, 4 pages.
"Supplemental Notice of Allowance", U.S. Appl. No. 14/134,993, dated Mar. 2, 2016, 6 pages.
"Supplemental Notice of Allowance", U.S. Appl. No. 14/447,464, dated Jan. 12, 2016, 2 pages.
"Foreign Office Action", CN Application No. 201380015757.1, dated Jul. 11, 2016, 13 pages.
"Foreign Office Action", CN Application No. 201380017348.5, dated Jun. 17, 2016, 7 pages.
"Foreign Office Action", EP Application No. 13765041.2, dated Aug. 4, 2016, 5 pages.
"Non-Final Office Action", U.S. Appl. No. 13/397,539, dated Sep. 9, 2016, 16 pages.
"Non-Final Office Action", U.S. Appl. No. 13/432,311, dated Aug. 17, 2016, 18 pages.
"Non-Final Office Action", U.S. Appl. No. 14/617,606, dated Sep. 9, 2016, 12 pages.
"Non-Final Office Action", U.S. Appl. No. 15/171,924, dated Jul. 13, 2016, 8 pages.
"Restriction Requirement", U.S. Appl. No. 14/635,474, dated Jul. 12, 2016, 5 pages.
"Final Office Action", U.S. Appl. No. 13/722,917, dated Sep. 23, 2015, 14 pages.
"Non-Final Office Action", U.S. Appl. No. 13/397,516, dated Sep. 24, 2015, 14 pages.
"Non-Final Office Action", U.S. Appl. No. 13/397,539, dated Oct. 1, 2015, 12 pages.
"Non-Final Office Action", U.S. Appl. No. 13/774,875, dated Sep. 16, 2015, 8 pages.
"Notice of Allowance", U.S. Appl. No. 13/397,495, dated Oct. 20, 2015, 6 pages.
"Final Office Action", U.S. Appl. No. 14/617,606, dated Dec. 27, 2016, 13 pages.
"Foreign Office Action", AU Application No. 2013361148, dated Feb. 15, 2017, 3 pages.
"Foreign Office Action", CN Application No. 201380017348.5, dated Jan. 14, 2016, 12 pages.
"Foreign Office Action", JP Application No. 2015-501688, dated Dec. 20, 2016, 8 pages.
"Foreign Office Action", TW Application No. 102101510, dated Dec. 6, 2016, 11 pages.
"Non-Final Office Action", U.S. Appl. No. 13/397,617, dated Jan. 12, 2017, 10 pages.
"Non-Final Office Action", U.S. Appl. No. 14/617,769, dated Jan. 12, 2017, 10 pages.
"Notice of Allowance", U.S. Appl. No. 15/171,924, dated Feb. 1, 2017, 8 pages.
"Second Written Opinion", Application No. PCT/US2016/015496, dated Feb. 9, 2017, 7 pages.
"Second Written Opinion", Application No. PCT/US2016/015869, dated Jan. 20, 2017, 5 pages.
"Second Written Opinion", Application No. PCT/US2016/015873, dated Feb. 6, 2017, 6 pages.
"Supplemental Notice of Allowance", U.S. Appl. No. 14/635,474, dated Feb. 2, 2017, 4 pages.
"Corrected Notice of Allowance", U.S. Appl. No. 15/171,924, dated Nov. 30, 2016, 2 pages.
"Examiner's Answer to Appeal Brief", U.S. Appl. No. 13/428,879, dated Oct. 12, 2016, 18 pages.
"Final Office Action", U.S. Appl. No. 13/397,617, dated Sep. 21, 2016, 10 pages.
"Foreign Office Action", CN Application No. 201380017348.5, dated Oct. 18, 2016, 7 pages.
"Non-Final Office Action", U.S. Appl. No. 13/440,165, dated Sep. 22, 2016, 13 pages.
"Non-Final Office Action", U.S. Appl. No. 13/722,917, dated Dec. 6, 2016, 18 pages.
"Notice of Allowance", U.S. Appl. No. 13/420,388, dated Oct. 6, 2016, 5 pages.

(56) References Cited

OTHER PUBLICATIONS

"Notice of Allowance", U.S. Appl. No. 14/635,474, dated Oct. 17, 2016, 10 pages.
"Notice of Allowance", U.S. Appl. No. 15/171,924, dated Oct. 21, 2016, 8 pages.
"Advisory Action", U.S. Appl. No. 13/432,311, dated Jul. 14, 2017, 3 pages.
"Corrected Notice of Allowance", U.S. Appl. No. 13/397,539, dated Jun. 29, 2017, 2 pages.
"Corrected Notice of Allowance", U.S. Appl. No. 13/397,617, dated Aug. 15, 2017, 2 pages.
"Corrected Notice of Allowance", U.S. Appl. No. 13/397,617, dated Jul. 26, 2017, 3 pages.
"Final Office Action", U.S. Appl. No. 13/722,917, dated Jul. 12, 2017, 19 pages.
"Final Office Action", U.S. Appl. No. 14/617,606, dated Sep. 5, 2017, 15 pages.
"Foreign Notice of Allowance", AU Application No. 2013361148, dated Jul. 17, 2017, 3 pages.
"Foreign Office Action", JP Application No. 2015-501688, dated Jul. 4, 2017, 6 pages.
"Non-Final Office Action", U.S. Appl. No. 14/447,446, dated Jun. 9, 2017, 15 pages.
"Notice of Allowance", U.S. Appl. No. 15/432,756, dated Jun. 23, 2017, 8 pages.
"Foreign Office Action", JP Application No. 2015-503284, dated Aug. 16, 2017, 12 pages.
"Non-Final Office Action", U.S. Appl. No. 15/642,020, dated Oct. 6, 2017, 14 pages.
"Non-Final Office Action", U.S. Appl. No. 13/432,311, dated Sep. 20, 2017, 27 pages.
"Foreign Office Action", CN Application No. 201380015757.1, dated Dec. 19, 2017, 10 pages.
"Foreign Office Action", JP Application No. 2015-501688, dated Dec. 5, 2017, 7 pages.
"Foreign Office Action", JP Application No. 2015-549765, dated Nov. 1, 2017, 7 pages.
"Foreign Office Action", RU Application No. 2015124081, dated Nov. 14, 2017, 10 pages.
"Notice of Allowance", U.S. Appl. No. 14/617,769, dated Nov. 17, 2017, 9 pages.
"Foreign Office Action", JP Application No. 2017-018727, dated Feb. 21, 2018, 4 pages.
"Corrected Notice of Allowance", U.S. Appl. No. 13/397,539, dated Apr. 12, 2017, 2 pages.
"Corrected Notice of Allowance", U.S. Appl. No. 13/397,539, dated Apr. 24, 2017, 2 pages.
"Corrected Notice of Allowance", U.S. Appl. No. 15/171,924, dated Mar. 31, 2017, 2 pages.
"Corrected Notice of Allowance", U.S. Appl. No. 15/171,924, dated May 17, 2017, 2 pages.
"*Ex Parte Quayle* Action", U.S. Appl. No. 14/617,769, Jun. 2, 2017, 7 pages.
"Final Office Action", U.S. Appl. No. 13/432,311, dated May 15, 2017, 22 pages.
"Foreign Notice of Allowance", CN Application No. 201380067523.1, dated Jun. 2, 2017, 4 pages.
"Foreign Notice of Allowance", TW Application No. 102101510, dated Mar. 23, 2017, 4 pages.
"Foreign Office Action", AU Application No. 2013361148, dated Apr. 11, 2017, 3 pages.
"Foreign Office Action", CN Application No. 201380015757.1, dated Mar. 27, 2017, 12 pages.
"Foreign Office Action", CN Application No. 201380067523.1, dated Apr. 17, 2017, 6 pages.
"International Preliminary Report on Patentability", Application No. PCT/US2016/015871, dated May 15, 2017, 10 pages.
"International Preliminary Report on Patentability", Application No. PCT/US2016/015873, dated May 15, 2017, 8 pages.
"International Preliminary Report on Patentability", Application No. PCT/US2016/015496, dated May 4, 2017, 9 pages.
"Non-Final Office Action", U.S. Appl. No. 14/617,606, dated Mar. 27, 2017, 14 pages.
"Notice of Allowance", U.S. Appl. No. 13/397,539, dated Mar. 22, 2017, 7 pages.
"Notice of Allowance", U.S. Appl. No. 13/397,617, dated Apr. 25, 2017, 5 pages.
"Notice of Allowance", U.S. Appl. No. 13/440,165, dated Mar. 23, 2017, 5 pages.
"Final Office Action Issued in U.S. Appl. No. 13/432,372", dated Mar. 18, 2016, 38 Pages.
"Non-Final Office Action Issued in U.S. Appl. No. 13/432,372", dated Jul. 1, 2016, 11 Pages.
"Non-Final Office Action Issued in U.S. Appl. No. 13/432,372", dated Aug. 27, 2015, 36 Pages.
"Examiner's Answer to Appeal Brief Issued in U.S. Appl. No. 13/477,646", dated Oct. 26, 2016, 12 Pages.
"Final Office Action Issued in U.S. Appl. No. 13/477,646", dated Nov. 24, 2015, 39 Pages.
"Final Office Action Issued in U.S. Appl. No. 13/477,646", dated Feb. 23, 2015, 36 Pages.
"Final Office Action Issued in U.S. Appl. No. 13/477,646", dated May 5, 2014, 26 Pages.
"Non Final Office Action Issued in U.S. Appl. No. 13/477,646", dated Jun. 18, 2015, 44 Pages.
"Non-Final Office Action Issued in U.S. Appl. No. 13/477,646", dated Oct. 6, 2014, 35 Pages.
"Non-Final Office Action Issued in U.S. Appl. No. 13/477,646", dated Nov. 22, 2013, 21 Pages.
"Office Action Issued in European Patent Application No. 13770174.4", dated Mar. 11, 2015, 8 Pages.
"Office Action Issued in European Patent Application No. 13770174.4", dated Dec. 21, 2015, 6 Pages.
"Office Action Issued in European Patent Application No. 13770174.4", dated Jul. 1, 2015, 6 Pages.
"Supplementary Search Report Issued in European Patent Application No. 13770174.4", dated Mar. 3, 2015, 3 Pages.
"Final Office Action Issued in U.S. Appl. No. 14/178,731", dated Aug. 12, 2015, 13 Pages.
"Non-Final Office Action Issued in U.S. Appl. No. 14/178,731", dated Apr. 17, 2015, 11 Pages.
"Non Final Office Action Issued in U.S. Appl. No. 15/417,325", dated May 17, 2018, 9 Pages.
"Fourth Office Action Issued in Chinesse Patent Application No. 201380015757.1", dated Aug. 24, 2018, 8 Pages.
"First Office Action and Search Report Issued in Chinese Patent Application No. 201380017346.6", dated Jan. 28, 2016, 11 Pages.
"Second Office Action Issued in Chinese Patent Application No. 201380017346.6", dated Oct. 9, 2016, 6 Pages.
"Third Office Action Issued in Chinese Patent Application No. 201380017346.6", dated Jan. 25, 2017, 6 Pages.
"First Office Action and Search Report Issued in Chinese Patent Application No. 201380067523.1", dated Aug. 22, 2016, 12 Pages.
"Office Action Issued in Japanese Patent Application No. 2015-503284", dated Dec. 22, 2016, 7 Pages.
Travis, et al., "Wedge Optics in Flat Panel Displays", In Proceedings of the IEEE, vol. 101, Issue 1, Jul. 14, 2011, 15 Pages.
"Office Action Issued in Korean Patent Application No. 10-2014-7030258", dated Feb. 25, 2019, 09 Pages.
"Office Action Issued in Chinese Patent Application No. 201380015757.1", dated Feb. 19, 2019, 06 Pages.
"Non Final Office Action Issued in U.S. Appl. No. 15/417,325", dated Dec. 13, 2018, 40 Pages.
"Office Action Issued in Japanese Patent Application No. 2017-241569", dated Nov. 21, 2018, 6 Pages.
"Office Action Issued in Korean Patent Application No. 10-2014-7027746", dated May 23, 2019, 08 Pages.
"Office Action Issued in Japanese Patent Application No. 2017-241569", dated May 27, 2019, 6 Pages.

* cited by examiner

WAVEGUIDE OPTICS FOCUS ELEMENTS

BACKGROUND

Virtual reality can be viewed as a computer-generated simulated environment in which a user has an apparent physical presence. A virtual reality experience can be generated in 3D and viewed with a head-mounted display (HMD), such as glasses or other wearable display device that has near-eye display panels as lenses to display a virtual reality environment, which replaces the actual environment. Augmented reality, however, provides that a user can still see through the display lenses of the glasses or other wearable display device to view the surrounding environment, yet also see images of virtual objects that are generated for display and appear as a part of the environment. Augmented reality can include any type of input such as audio and haptic inputs, as well as virtual images, graphics, and video that enhances or augments the environment that a user experiences. As an emerging technology, there are many challenges and design constraints with augmented reality, from generation of the virtual objects and images so that they appear realistic in a real environment, to developing the optics small and precise enough for implementation with a wearable display device.

Some focusing systems for display technologies are typically too large and complex to be implemented in imaging units for wearable display devices. A mechanical mechanism to adjust focus is generally noisy, uses quite a lot of power, and is likely to be too slow to keep up with eye movement. Some focus adjustment may be accomplished with LCD lenses, but they are fixed focus and slower for higher and higher diopter powers. Another focusing system includes Alvarez lenses positioned on either side of a waveguide, where the first lens focuses the real object to focus infinity, the light is combined with the display light in the waveguide, and the second lens focuses back to the original viewing distance between the waveguide and the eye. However, the image quality of the lenses is limited and can induce distortion in the see-through and display light. Additionally, the lenses are relatively large, motors use a large amount of power (for a mobile device), and the mechanical mechanism to adjust focus is generally too slow to keep up with eye movement.

Focus accommodation for augmented reality near-eye displays is needed so that the conflict between stereopsis and focus accommodation cues is negated. However, current techniques for focus accommodation in waveguide displays are problematic, and proposed solutions are not ideal from mechanical, optical performance, and latency perspectives. With stereopsis, a virtual image that is projected or displayed for augmented reality imaging appears at focal infinity while a real object in the environment over which the virtual image is displayed appears closer. A viewer's eyes attempt to focus on the nearer, real object while also focusing at infinity even though the virtual image is projected very close to the viewer's eyes. This can cause viewer eye strain and fatigue, which may diminish the user experience when using a wearable display device.

SUMMARY

This Summary introduces simplified concepts of waveguide optics focus elements, and the concepts are further described below in the Detailed Description and/or shown in the Figures. This Summary should not be considered to describe essential features of the claimed subject matter, nor used to determine or limit the scope of the claimed subject matter.

Waveguide optics focus elements are described. In embodiments, an imaging structure includes a waveguide for viewing of an environment that is viewable with the imaging structure. The waveguide combines light of a virtual image with the transmitted light of the environment so that the virtual image appears as part of the environment for augmented-reality imaging or virtual-reality imaging. The imaging structure also includes one or more focus elements that are integrated in the waveguide and switchable to focus the virtual image at a focus depth that approximately correlates to a focal distance of the environment. The focus elements can each be implemented for a different focus depth of the virtual image, and the focus depth is adjustable based on a combination of the focus elements being switched-on or switched-off.

In other embodiments, the focus elements that are integrated in the waveguide can be implemented as switchable output reflective devices or switchable output diffractive devices, such as Switchable Bragg Gratings. For example, a first switchable output diffractive device is implemented to focus the virtual image at infinity when switched-on, yet allow light to continue propagating down the waveguide when switched-off. This first switchable output diffractive device has simple wedge power to diffract light that is propagating in the waveguide into a direction that can be viewed by a user. A second switchable output diffractive device is implemented to focus the virtual image at an intermediate focus depth when switched-on, yet allow light to continue propagating down the waveguide when switched-off. The diffractive power of this second switchable output diffractive device is a combination of wedge power and lens power. A third switchable output diffractive device is implemented to focus the virtual image at a near focus depth when switched-on, yet allow light to continue propagating down the waveguide when switched-off. The diffractive power of the third switchable output diffractive device is a combination of wedge power and lens power, and the lens power of this third device is greater than the lens power of the second switchable output diffractive device.

BRIEF DESCRIPTION OF THE DRAWINGS

Embodiments of waveguide optics focus elements are described with reference to the following Figures. The same numbers may be used throughout to reference like features and components that are shown in the Figures.

DETAILED DESCRIPTION

Embodiments of waveguide optics focus elements are described. An imaging structure can be implemented with focus elements that are switchable to focus a virtual image at a focus depth that approximately correlates to a focal distance of an environment that is viewed through the imaging structure. For augmented reality imaging and/or virtual reality imaging, virtual objects and/or images that appear closer than infinity (e.g., at a close focus distance) is an improvement over displays that are based at infinity focus. Embodiments of waveguide optics focus elements can be implemented for wearable display devices, hand-held augmented reality displays, and larger format displays, such as vehicle head up displays or even for larger architectural displays. Embodiments of waveguide optics focus elements are also applicable for non-see-through displays of any size and configuration that provide a user with a virtual image at some viewing distance other than the distance of the user's eyes to the display device.

In embodiments, waveguide optics focus elements provides focus accommodation with no power, lens power, wedge power, or a combination of lens power and wedge power. Lens power can be added to the input diffraction element of a waveguide display, which reduces the number of lenses in a system. Lens power can also be added to the output diffractive element of a waveguide display. Switchable diffractive devices, such as Switchable Bragg Gratings (SBGs), can be implemented for focus accommodation so that the focal depth of a virtual image appears at approximately the same focal distance as an object or image that is viewed in an environment over which the virtual image is projected.

While features and concepts of waveguide optics focus elements can be implemented in any number of different devices, systems, environments, and/or configurations, embodiments of waveguide optics focus elements are described in the context of the following example devices, systems, and methods.

Figure 1:
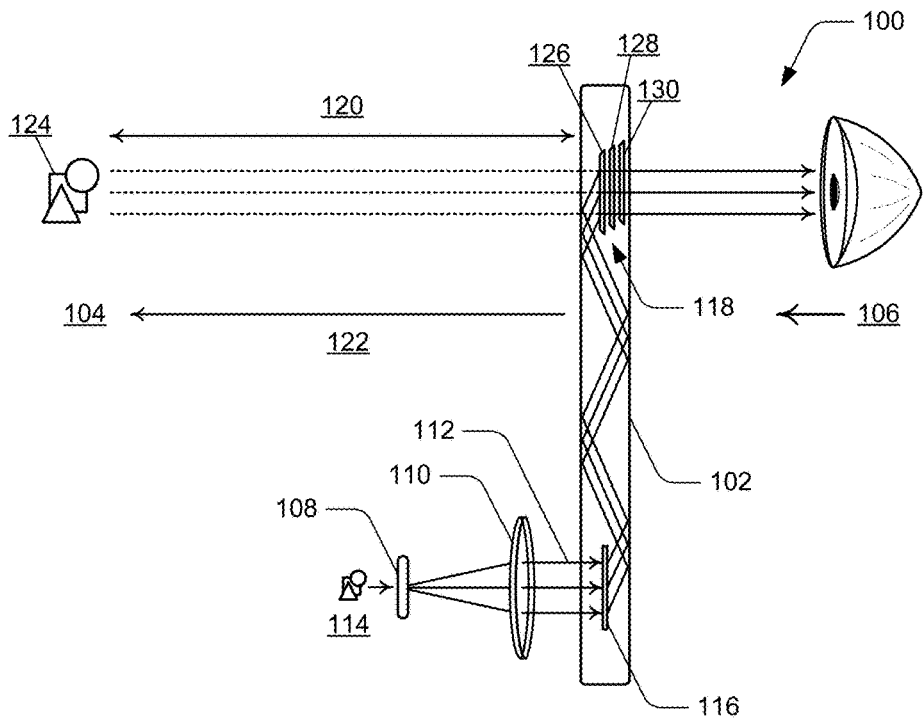
FIG. 1 illustrates an example imaging structure in accordance with one or more embodiments of waveguide optics focus elements.

FIG. 1 illustrates an example imaging structure 100 that includes waveguide optics focus elements in accordance with embodiments described herein. The imaging structure 100 includes a waveguide 102 for see-through viewing of an environment 104 that is viewable through the imaging structure, such as for a user viewing the environment from a perspective 106. The imaging structure also includes an image microdisplay 108 and an imaging optic 110 that implement an input mechanism to direct the light 112 of a generated, virtual image 114 into the waveguide where the light of the virtual image is then reflected through the waveguide. The image microdisplay 108 can be implemented as a liquid crystal on silicon (LCOS) microdisplay that projects the virtual image through the imaging optic 110 into the waveguide, or implemented for any other type and size of display device.

In embodiments, the imaging structure 100 can be implemented in an imaging unit of a head-mounted display (HMD), such as glasses or other type of wearable display device, hand-held display, or larger format display such as a vehicle head up display. An imaging unit that incorporates the imaging structure 100 can generate the virtual image 114 to appear as part of the environment 104 for augmented-reality imaging and/or viewing. Waveguide optics-based displays can be implemented to collimate light and then direct the light into the waveguide 102 by diffractive or reflective components, such as any type of optics, lenses, or other light-directing mechanisms. The components for extracting light out of the waveguide and projecting the light of an image for viewing can also be diffractive or reflective. Generally the diffractive or reflective components for in-coupling and out-coupling have a simple wedge power (also referred to as prismatic power). Additionally, the diffractive or reflective components can be implemented with a component of lens power for both lens power and prismatic power.

In implementations, the input mechanism (e.g., the image microdisplay 108 and imaging optic 110) can include a lens power for the two functions of collimating the light and injecting the light into the waveguide 102. This can be implemented with a diffractive device. Additionally, the input mechanism may be combined with other lenses and/or optics components. For example, the waveguide 102 of the imaging structure 100 may also include an input grating 116 to add diffractive power at the input of the light to the waveguide. At the light output of the waveguide 102, an output mechanism may be implemented for less lens power so that a displayed virtual image appears closer than infinity in the environment, as viewed through the imaging structure.

The wedge power of the waveguide normal output grating and the diffractive power of a lens can be combined in a waveguide display. Generally, the diffraction efficiency of diffractive surfaces is less than 100%, and some of the light passes directly through the diffractive surface. For example, some of the light that is propagating in a waveguide and that is not diffracted will continue down the waveguide until it hits the diffractive surface again. Some of the light will be diffracted out of the waveguide and some of the light will continue propagating down the waveguide. For waveguide displays, the light output at the exit pupil can be expanded so that the input beam of light is much smaller than the exiting light. For an output diffractive surface that has lens power, the light will be diffracted out of the waveguide in the correct direction for that part of the diffractive lens (and the input beam of light can still be smaller than the output lens size).

In embodiments of waveguide optics focus elements as described herein, the waveguide 102 includes focus elements 118 that are integrated in the waveguide and are switchable on and off to focus the virtual image 114 at a focus depth 120 that approximately correlates to a focal distance 122 of the environment 104. The virtual image 114 is also shown displayed as the focused virtual image 124 at the focus depth 120. In this example, three focus elements 118 (e.g., switchable output diffractive devices) are integrated in the waveguide 102 and each is implemented for a different focus depth of the virtual image. For example, a first focus element 126 is implemented to focus the virtual image 114 at infinity (e.g., as the focused virtual image 124) when switched-on, yet allow the light 112 to continue propagating down the waveguide when switched-off. In alternate implementations, any of the focus elements may be implemented to switch-off to focus the virtual image and switch-on to allow the light to continue propagating down the waveguide, or may be implemented to switch-in and/or switch-out.

A second focus element 128 is implemented to focus the virtual image 114 at an intermediate focus depth 200 (e.g., as the focused virtual image 202 shown in FIG. 2) when switched-on, yet allow the light to continue propagating down the waveguide when switched-off. The second focus element 128 focuses the virtual image at the intermediate focus depth 200 that approximately correlates to a focal distance 204 of the environment 104. A third focus element 130 is implemented to focus the virtual image 114 at a near focus depth 300 (e.g., as the focused virtual image 302 shown in FIG. 3) when switched-on, yet allow the light to continue propagating down the waveguide when switched-off. The third focus element 130 focuses the virtual image at the near focus depth 300 that approximately correlates to a focal distance 304 of the environment 104.

Although the imaging structure 100 that is shown and described in this example includes the three focus elements 118, the waveguide 102 can be implemented with any number of focus elements in other embodiments. For example, the waveguide may include only one focus element, or more than three focus elements, depending on the number of discrete focus levels that are implemented. In implementations, three or four discrete focus levels may adequately accommodate user depth of field for augmented reality imaging. The number of focus elements that are implemented can be selectively switched-on and/or switched-off, or may be implemented to switch-in and/or switch-out, to change or adjust the focus depth of a displayed virtual image.

The focus elements 118 can be implemented as switchable output diffractive devices, such as Switchable Bragg Gratings (SBGs), as switchable output reflective devices, or as any type of active device, such as polymer liquid crystal devices. Switchable Bragg Gratings are manufactured by SBG Labs and are described as having sub-millisecond switching speeds providing a high diffraction efficiency when activated, as well as optical transparency when inactive. The multiple focus elements 118 implemented as SBGs provide several focal distances for the imaging structure 100. The SBGs utilize Holographic Polymer-Dispersed Liquid Crystals and when switched-off, the refractive index of the liquid crystal approximately matches that of the surrounding polymer of the waveguide so that the SBG is essentially transparent to the display light. When an SBG is switched-on, the liquid crystal has a different refractive index than the polymer of the waveguide. An SBG is also a holographic device and the spectral bandwidth is very limited, so that the light of the environment image (the real image) is not affected (or very little) by the focusing device. Accordingly, the environment can be focused as normal, and the light of the virtual image overlaid on top of the environment light for augmented reality imaging.

In embodiments, a wearable display device that incorporates the imaging structure 100, such as the example wearable display device as described with reference to FIG. 7, can include eye-tracking cameras used to determine user pupil locations and to track eye movements. Additionally, a wearable display device may include other sensors, such as head tracking, world recognition, and/or proximity sensors that can be used to determine the eye accommodation distance of the user (also referred to herein as focus adjust). A wearable display device can also include a controller and/or an imaging application, such as a software application, to implement embodiments of waveguide optics focus elements as described herein. The imaging application can receive focus adjust data, such as eye-tracking data and/or other sensor data, and determine the focal distance of the environment based on the focus adjust data that indicates the eye accommodation distance of a user. The imaging application is also implemented to initiate focus control signals to control a combination of the focus elements 118 being switched-on or switched-off to adjust the focus depth of the virtual image.

For example, the first focus element 126 is implemented to focus the virtual image 114 at infinity (e.g., as the focused virtual image 124) when switched-on and when the second and third focus elements are switched-off. The second focus element 128 is implemented to focus the virtual image 114 at an intermediate focus depth 200 (e.g., as the focused virtual image 202 shown in FIG. 2) when switched-on and when the first and third focus elements are switched-off. The third focus element 130 is implemented to focus the virtual image 114 at a near focus depth 300 (e.g., as the focused virtual image 302 shown in FIG. 3) when switched-on and the second and third focus elements are switched-off. In alternate embodiments, more than one of the focus elements 118 may be switched-on to focus the virtual image at a desired focus depth. Multiple combinations of the diffractive devices may be used to provide a larger range and increased number of focus settings, whereby the secondary focus elements can be used to fine tune the focus distance.

Figure 2:
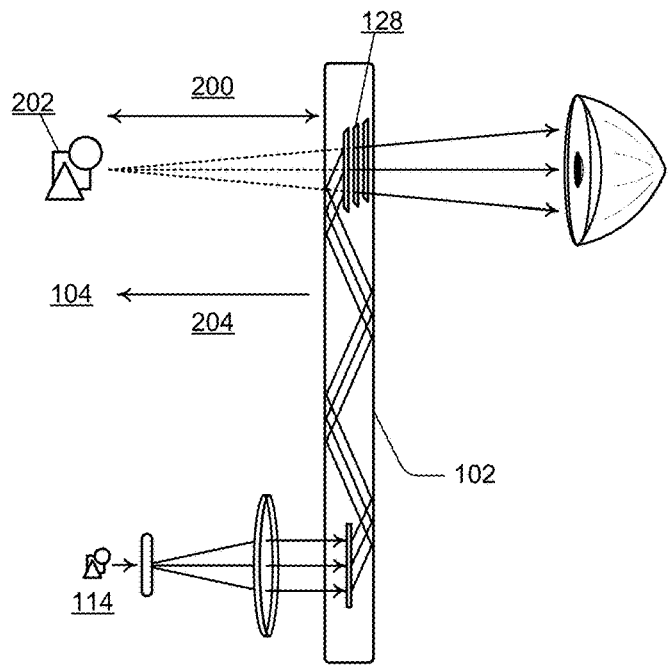
FIGS. 2 and 3 further illustrate the example imaging structure shown in FIG. 1 in accordance with one or more embodiments of waveguide optics focus elements.

FIG. 2 further illustrates the example imaging structure 100 that is shown and described with reference to FIG. 1. As described above, the focus element 128 in the waveguide 102 is implemented to focus the virtual image 114 at an intermediate focus depth 200 as the focused virtual image 202 when switched-on, and diffract the light of the virtual image when switched-off. The intermediate focus depth 200 is representative of any focus depth between infinity (e.g., the focus depth 120 shown in FIG. 1) and the near focus depth 300 shown in FIG. 3.

Figure 3:
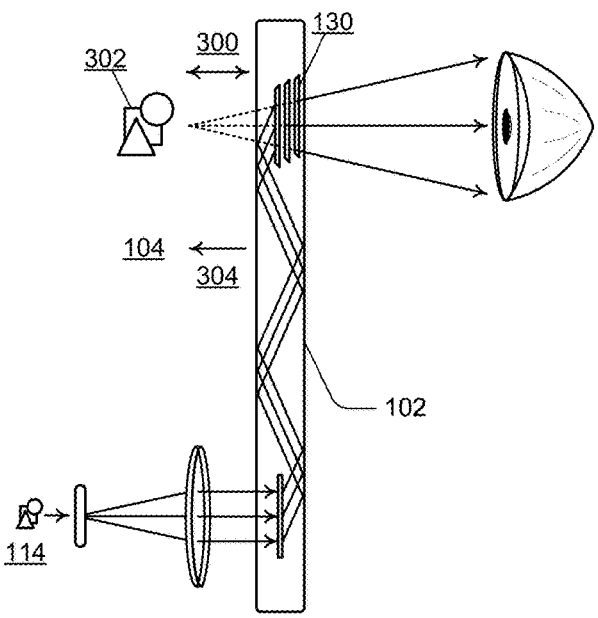

FIG. 3 further illustrates the example imaging structure 100 that is shown and described with reference to FIG. 1. As described above, the focus element 130 in the waveguide 102 is implemented to focus the virtual image 114 at a near focus depth 300 as the focused virtual image 302 when switched-on, and diffract the light of the virtual image when switched-off.

Figure 4:
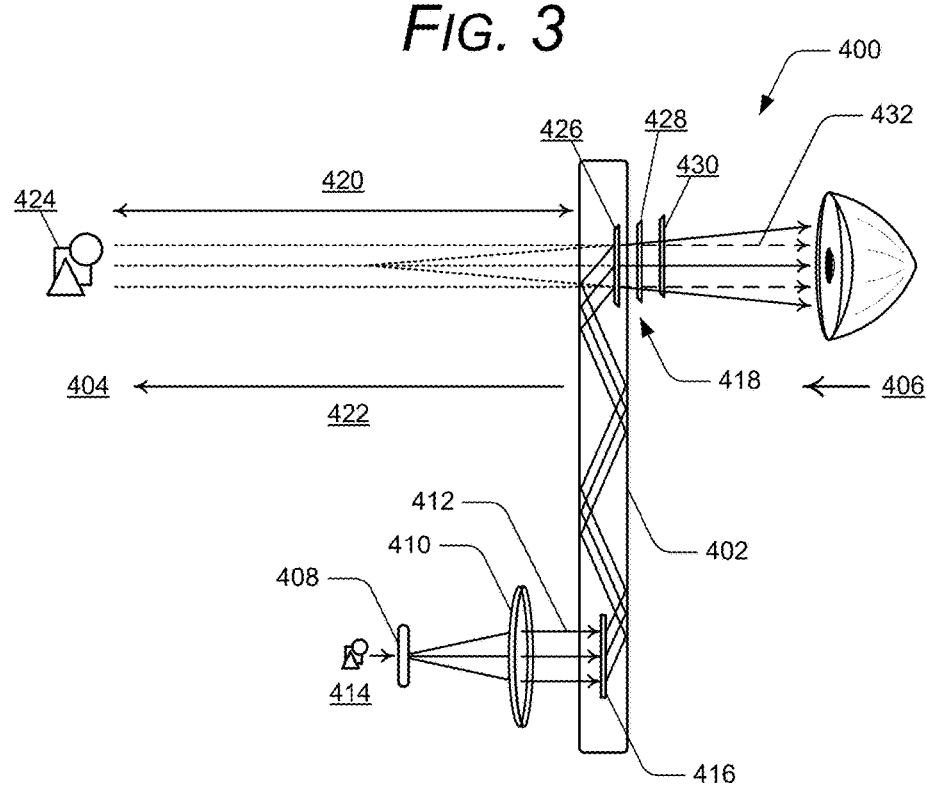
FIG. 4 illustrates another example imaging structure in accordance with one or more embodiments of waveguide optics focus elements.

FIG. 4 illustrates an alternate example of an imaging structure 400 that can be implemented with waveguide optics focus elements in accordance with embodiments described herein. As generally described with reference to FIG. 1, the imaging structure 400 includes a waveguide 402 for see-through viewing of an environment 404 that is viewable through the imaging structure, such as for a user viewing the environment from a perspective 406. The imaging structure also includes an image microdisplay 408 and an imaging optic 410 that implement an input mechanism to direct the light 412 of a generated, virtual image 414 into the waveguide where the light of the virtual image is then reflected through the waveguide. Optionally, the waveguide of the imaging structure 400 may also include an input grating 416 to add diffractive power at the input of the light to the waveguide.

In embodiments of waveguide optics focus elements as described herein, the waveguide 402 includes focus elements 418 that are switchable on and off to focus the virtual image 414 at a focus depth 420 that approximately correlates to a focal distance 422 of the environment 404. The virtual image 414 is also shown displayed as the focused virtual image 424 at the focus depth 420. In this example imaging structure 400, a first focus element 426 is integrated in the waveguide. Additional focus elements 428 and 430 are implemented outside of the waveguide 402 so that the output switchable diffractive surfaces of wedge power and lens power are separated. The first focus element 426 that is integrated in the waveguide is implemented to focus the virtual image 414 at infinity as the focused virtual image 424. The secondary focus elements 428 and 430 can be utilized to implement lens power for the imaging structure.

In this configuration of the example imaging structure 400, the diffraction efficiency may not be 100%, which may result in a ghost image 432 that is generated by light passing through the diffractive lens in the zero order (un-diffracted state). For example, most of the exit light will be directed into the intended focus element 428, but there may be some of the light that exits through the first focus element 426 at focus infinity to create the ghost image 432. In implementations, focus elements that have an improved diffraction efficiency so as not to create a ghost image may be implemented in this configuration of the example imaging structure 400. In embodiments, the example imaging structure 100 with the integrated focus elements 118 may be a preferable implementation because the light that does not get diffracted out of the waveguide continues to propagate within the waveguide rather than projecting a ghost image.

Figure 5:
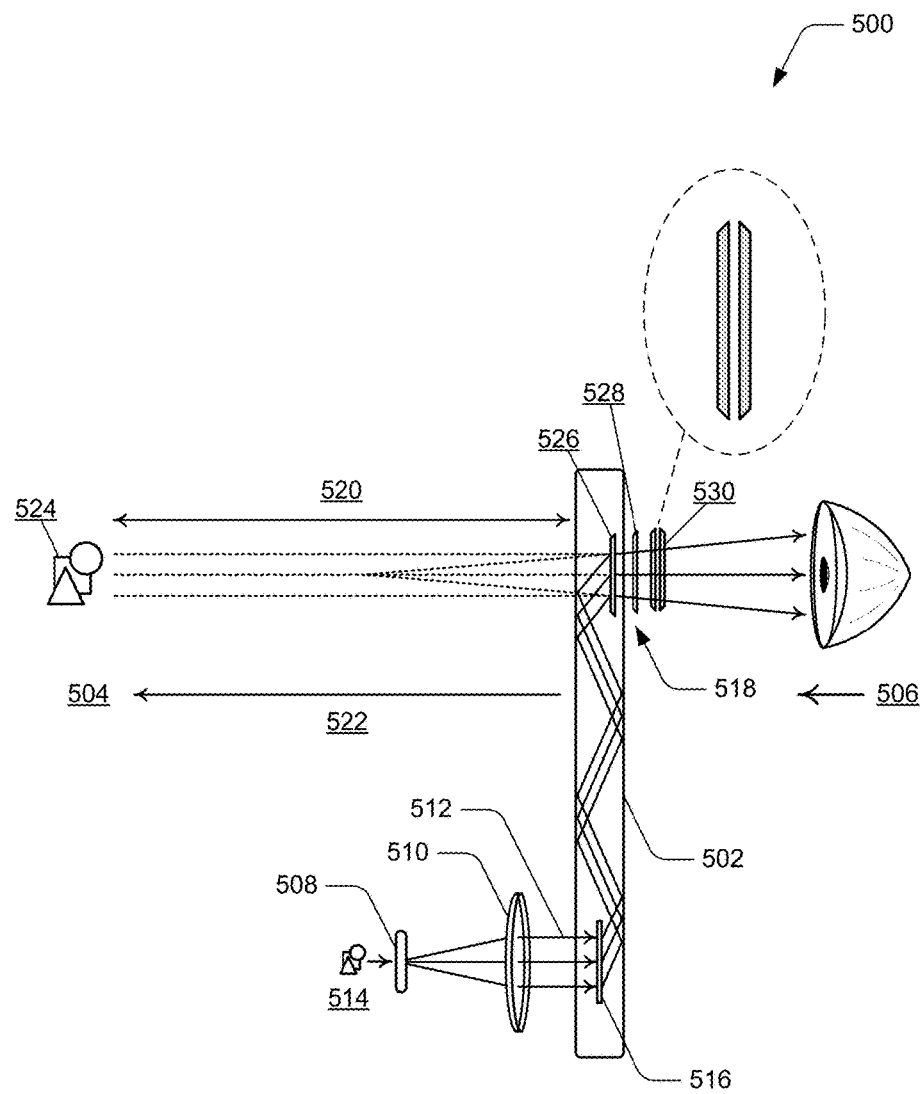
FIG. 5 illustrates another example imaging structure in accordance with one or more embodiments of waveguide optics focus elements.

FIG. 5 illustrates another alternate example of an imaging structure 500 that can be implemented with waveguide optics focus elements in accordance with embodiments described herein. As generally described with reference to FIG. 1, the imaging structure 500 includes a waveguide 502 for see-through viewing of an environment 504 that is viewable through the imaging structure, such as for a user viewing the environment from a perspective 506. The imaging structure also includes an image microdisplay 508 and an imaging optic 510 that implement an input mechanism to direct the light 512 of a generated, virtual image 514 into the waveguide where the light of the virtual image is then reflected through the waveguide. Optionally, the waveguide of the imaging structure 500 may also include an input grating 516 to add diffractive power at the input of the light to the waveguide.

In embodiments of waveguide optics focus elements as described herein, the waveguide 502 includes focus elements 518 that are switchable on and off to focus the virtual image 514 at a focus depth 520 that approximately correlates to a focal distance 522 of the environment 504. The virtual image 514 is also shown displayed as the focused virtual image 524 at the focus depth 520. In this example imaging structure 500, a first focus element 526 is integrated in the waveguide. Additional focus elements 528 and 530 are implemented outside of the waveguide 502 so that the output switchable diffractive surfaces of wedge power and lens power are separated. The first focus element 526 that is integrated in the waveguide is implemented to focus the virtual image 514 at infinity as the focused virtual image 524. The secondary focus element 528 can be utilized to implement lens power for the imaging structure.

In this configuration of the example imaging structure 500, the focus element 530 is implemented as two switchable output diffractive devices, such as Switchable Bragg Gratings (SBGs), positioned back-to-back. This configuration forms a transmissive holographic lens that provides a combination of prismatic power and lens power outside of the waveguide. If implemented for a low wedge power, then the diffraction efficiency will also be low and the back-to-back configuration cancels the chromatic dispersion that may generate the ghost image as described with reference to FIG. 4.

Figure 6:
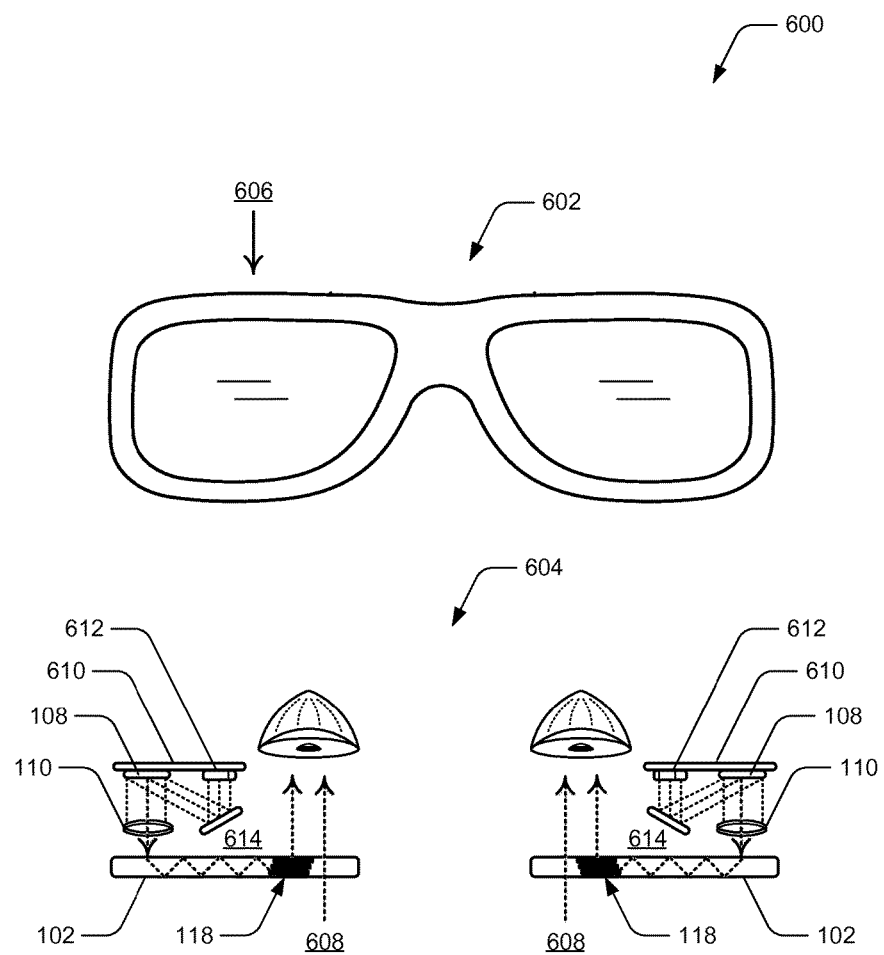
FIG. 6 illustrates an example system that includes examples of imaging units in which embodiments of waveguide optics focus elements can be implemented.

FIG. 6 illustrates an example system 600 in which various embodiments of waveguide optics focus elements can be implemented. An example wearable display device 602 includes left and right display lens systems with imaging units, such as imaging units 604 that are viewed from a perspective 606 of the wearable display device, as if viewing the display lens systems from the top of the device. In embodiments, the imaging units 604 can be implemented as left and right display lens systems of the wearable display device described with reference to FIG. 7. A wearable display device can be implemented as any type of glasses or head-mounted display (HMD) that includes implementations of the imaging units 604 (e.g., left and right display lens systems) through which a user can view the surrounding environment, yet also see virtual images that are generated for display and appear as a part of the environment. References to a left imaging unit and a right imaging unit, as described herein, correlate to a user's left and right eyes (e.g., from the perspective of wearing and looking through the wearable display device). Alternatively, the left and right imaging units may be described from the perspective of looking at the wearable display device.

The imaging units 604 include examples of the imaging structure 100 as shown and described with reference to FIGS. 1-3. For example, the imaging units include the waveguide 102 with the focus elements 118, as well as the input mechanism (e.g., the image microdisplay 108 and imaging optic 110) to direct the light of a virtual image into the waveguide where the light of the virtual image is then reflected through the waveguide. In this example, the imaging units 604 can be implemented with any number of micro display panels, imaging structures with direct emitters, lenses, and reflecting elements to display and project a virtual image into a see-through and reflecting waveguide. Alternatively, the imaging units 604 can be implemented with the example imaging structures 400 or 500 described with reference to respective FIGS. 4 and 5, or with other imaging unit configurations.

The see-through, reflecting waveguide 102 is a display optic implemented for internal reflection and conducts visible light of a virtual image that is generated by the imaging units 604 and projected for viewing by a user. The waveguide 102 also passes through light 608 of an image from the surrounding environment for viewing by the user (e.g., an image of the environment as viewed through the wearable display device). An imaging unit 604 with an imaging structure can also be implemented with components of the display lens system described with reference to FIG. 7 to implement embodiments of waveguide optics focus elements.

In embodiments, the imaging units 604 each include a printed circuit board 610 that incorporates an emitter structure 612, which direct emits the light that is reflected by a reflecting mirror 614 to illuminate the image microdisplay 108. The imaged light is then directed through the imaging optic 110 that directs the light into the waveguide 102. The emitter structure 612 can be implemented with lasers that direct emit the light, and a reflective spatial light modulator can be implemented as the microdisplay using the lasers for illumination.

Figure 7:
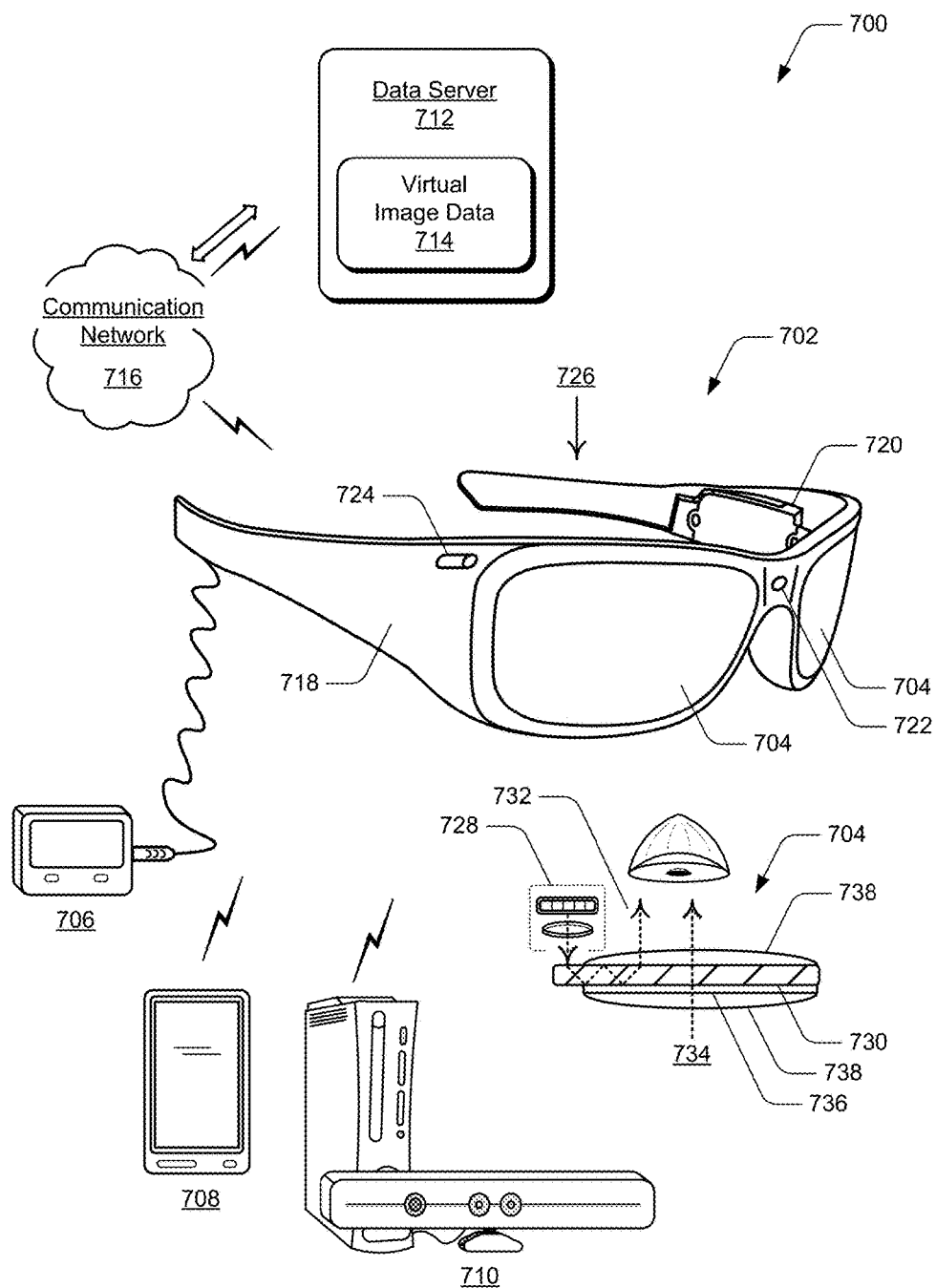
FIG. 7 illustrates an example system that includes an example of a wearable display device in which embodiments of waveguide optics focus elements can be implemented.

FIG. 7 illustrates an example system 700 that includes an example wearable display device 702 in which embodiments of waveguide optics focus elements can be implemented. The wearable display device can be implemented as any type of glasses or head-mounted display (HMD) that includes display lens systems 704 (e.g., left and right display lens systems) through which a user can view the surrounding environment, yet also see virtual images (e.g., any type of object, video, text, graphic, and the like) that are generated for display and appear as a part of the environment.

The wearable display device 702 can be implemented as an independent, portable system that includes memory, software, a processor, and/or a power source. Alternatively or in addition, the wearable display device may be communicatively linked to a controller 706 that includes any one or combination of the memory, software, processor, and/or power source, such as a battery unit. The controller can be implemented for wired or wireless communication with the wearable display device. The controller and/or the wearable display device can also be implemented with any number and combination of differing components as further described with reference to the example device shown in FIG. 9. For example, the controller and/or the wearable display device includes an imaging application implemented as computer-executable instructions, such as a software application, and executed by a processor to implement embodiments of waveguide optics focus elements as described herein.

In embodiments, the controller may be implemented as a dedicated device (e.g., the wired controller 706), as a mobile phone 708, a tablet or other portable computer device, a gaming system 710, or as any other type of electronic device that can be implemented to process and generate virtual images for display as part of the environment that is viewed through the display lens system of the wearable display device. The controller may communicate with the wearable display device wirelessly via WiFi™, Bluetooth™, infrared (IR), RFID transmission, wireless Universal Serial Bus (WUSB), cellular, or via other wireless communication techniques.

The example system 700 also includes a data server 712, or data service, that communicates, or otherwise distributes, virtual image data 714 to the wearable display device 702 via a communication network 716. For example, the data server may be part of a network-based gaming system that generates virtual images for augmented reality display at the wearable display device. Alternatively, the data server may be part of a navigation system that communicates navigation directions and information for display in the display lens systems 704 of the wearable display device. In another example, the data server may be part of a messaging service, such as an e-mail or text messaging system, that communicates e-mail and/or text messages to the wearable display device for display in the display lens systems, where a user can read a message as an augmented reality image that is displayed over the environment viewed through the wearable display device.

Any of the devices, servers, and/or services can communicate via the communication network 716, which may be implemented to include wired and/or wireless networks. The communication network can also be implemented using any type of network topology and/or communication protocol, and can be represented or otherwise implemented as a combination of two or more networks, to include IP-based networks and/or the Internet. The communication network may also include mobile operator networks that are managed by mobile operators, such as a communication service provider, cell-phone provider, and/or Internet service provider.

The wearable display device 702 includes a frame 718, such as in the form of glasses, goggles, or any other structure, that supports and incorporates the various components of the device, as well as serves as a conduit for electrical and other component connections. A components module 720 (or components modules on the left, right, and/or both sides of the device frame) incorporates any of the various components, such as processing and control circuitry, memory, software, a processor, GPS transceiver, and/or power source. The wearable display device may also include a microphone 722 to record audio data from the surrounding environment, as well as ear phones for audio feedback as part of an augmented reality experience.

The wearable display device 702 also includes various cameras 724 that capture video and still images of the surrounding environment. The image and video data can be processed on the device and/or by a controller device (e.g., controller 706), and used to create a mapping field to orient and track a user in the environment space. The wearable display device can also include eye-tracking cameras used to determine a user eyeball and/or pupil location, and to track eye movements. The wearable display device may also include a temperature sensor, as well as inertial sensors and/or attitude sensors, including MEMS gyros, magnetic sensors (e.g., a compass), and acceleration sensors for sensing position, orientation, and acceleration of the wearable display device.

An example of one display lens system 704 is shown from a viewer perspective 726 of the wearable display device 702, as if viewing the display lens system from the top of the device. The display lens system includes an imaging system 728, which can be implemented with any number of micro display panels, lenses, and reflecting elements to display and project a virtual image into a see-through and reflecting waveguide 730. A display lens system 704 can also be implemented as the imaging units described with reference to FIG. 6 that incorporate any of the imaging structures described with reference to FIGS. 1-5 to implement embodiments of waveguide optics focus elements. The see-through, reflecting waveguide 730 is implemented for internal reflection and conducts the visible light 732 of a virtual image that is generated by the imaging unit for viewing by a user, and also passes through the light 734 from the surrounding environment for viewing by the user.

The micro display panels, lenses, and/or reflecting elements of the imaging system 728 can be implemented with various display technologies, such as implemented with a transparent LCD, or using a transmissive projection technology where the light source is modulated by optically active material, backlit with white light. These technologies can be implemented using LCD type displays with powerful backlights and high optical energy densities. Alternatively, a micro display and/or reflecting element can be implemented using a reflective technology, such as digital light processing (DLP) and liquid crystal on silicon (LCOS), that reflects external light, which is reflected and modulated by an optical material.

In embodiments, the imaging system 728 (or other components of a display lens system 704) can be implemented to include an infra-red (IR) laser utilized for system calibrations and/or as an illumination source for an eye-tracking system and camera that tracks the position of a user's eyes and/or pupils. The eye-tracking system includes the eye-tracking illumination source, which is not a visible light, and includes an eye-tracking IR sensor. The IR sensor can be implemented as an IR camera that provides infrared image data of the eye for eye-tracking processing, or an IR sensor that detects eye reflections when the eye is illuminated. Alternatively or in addition, sensors can be implemented in a CMOS driver array to detect the feedback. In implementations, the light reflections (e.g., the IR return) may be directed with SBG or SRB methods. The see-through and reflecting waveguide 730 can also be utilized for the infrared illumination, and for eyeball reflections that the eye-tracking system uses to track the position of the user's eyes and/or pupils.

In this example, the display lens systems 704 include an optional opacity filter 736, and a see-through lens 738 on each side of the waveguide 730. The see-through lenses can be standard eye-glass lenses and made to prescription (or no prescription). The opacity filter selectively blocks natural light, either uniformly or on a per-pixel basis, from passing through the see-through and reflecting waveguide to enhance the contrast of a displayed virtual image.

Example method 800 is described with reference to FIG. 8 in accordance with one or more embodiments of waveguide optics focus elements. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 8:
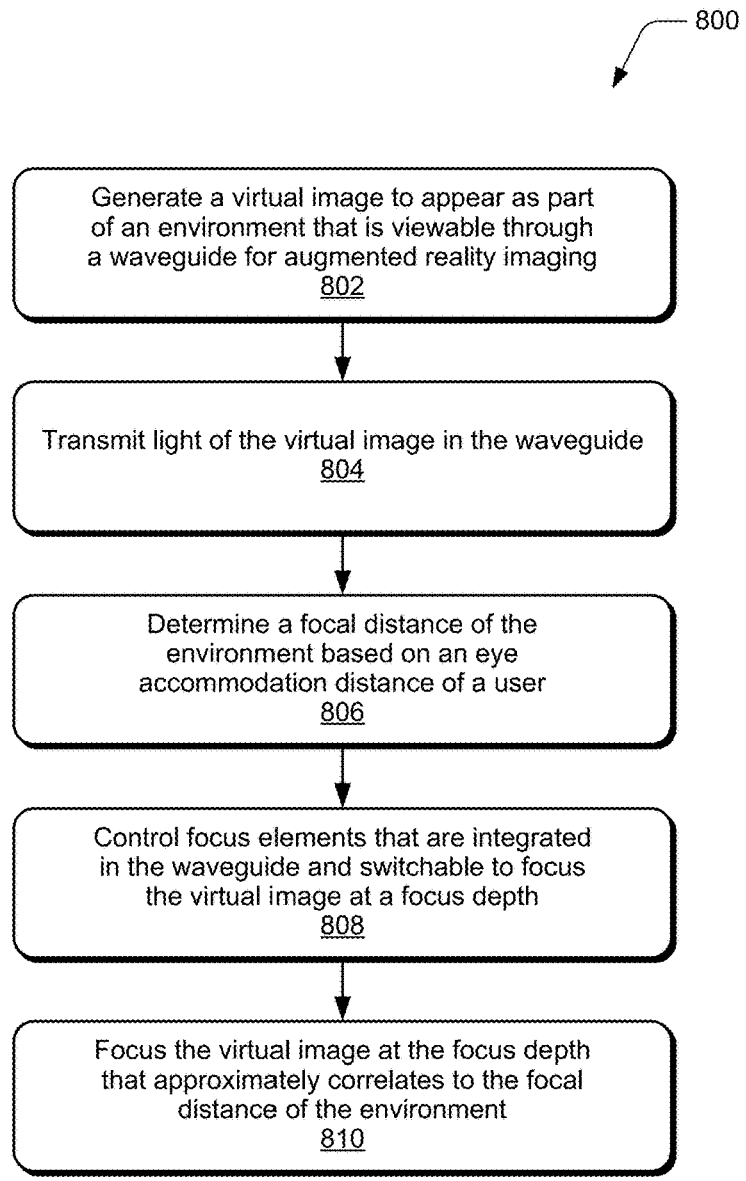
FIG. 8 illustrates example method(s) of waveguide optics focus elements in accordance with one or more embodiments.

FIG. 8 illustrates example method(s) 800 of waveguide optics focus elements. The order in which the method blocks are described are not intended to be construed as a limitation, and any number of the described method blocks can be combined in any order to implement a method, or an alternate method.

At block 802, a virtual image is generated to appear as part of an environment that is viewable through a waveguide for augmented reality imaging. For example, an imaging unit 604 (FIG. 6) that incorporates the example imaging structure 100 (FIG. 1) generates the virtual image 114 to appear as the focused virtual image 124 in the environment 104 that is viewable through the waveguide 102 for augmented reality imaging.

At block 804, light of the virtual image is transmitted in the waveguide. For example, the image microdisplay 108 and imaging optic 110 that implement the input mechanism direct the light 112 of the generated, virtual image 114 into the waveguide 102 where the light of the virtual image is then transmitted through the waveguide.

At block 806, a focal distance of the environment is determined based on an eye accommodation distance of a user. For example, the eye accommodation distance (or focal view) of the user can be based on eye-tracking, such as implemented with the wearable display device 702 (FIG. 7) that includes eye-tracking cameras used to determine user pupil locations and to track eye movements. Alternatively or in addition, the eye accommodation distance of the user (also referred to herein as focus adjust) may be determined by the type of content being displayed, or the focus adjust can be determined by other sensors on the wearable display device, such as head tracking, world recognition, and/or proximity sensors. The wearable display device also includes an imaging application 928 (FIG. 9), such as a software application, that receives focus adjust data and determines the focal distance 122 of the environment 104 based on the focus adjust data that indicates the focal view of a user.

At block 808, focus elements that are integrated in the waveguide and switchable to focus the virtual image at a focus depth are controlled. For example, the imaging application 928 controls the focus elements 118 that are integrated in the waveguide 102. The focus elements are each implemented for a different focus depth of the virtual image and are switchable on and off to focus the virtual image 114 at a focus depth. The focus elements can be implemented as switchable output reflective devices or switchable output diffractive devices, such as the Switchable Bragg Gratings (SBGs) described above.

At block 810, the virtual image is focused at the focus depth that approximately correlates to the focal distance of the environment. For example, the first focus element 126 focuses the virtual image 114 at infinity as the focused virtual image 124. The second focus element 128 focuses the virtual image 114 at an intermediate focus depth 200 as the focused virtual image 202. The second focus element 128 focuses the virtual image at the intermediate focus depth 200 that approximately correlates to a focal distance 204 of the environment 104. The third focus element 130 focuses the virtual image 114 at a near focus depth 300 as the focused virtual image 302. The third focus element 130 focuses the virtual image at the near focus depth 300 that approximately correlates to a focal distance 304 of the environment 104. In embodiments, the focus depth of the virtual image is adjusted based on a combination of the focus elements switched-on or switched-off. In alternate embodiments, more than one of the focus elements 118 may be switched-on to focus the virtual image at a desired focus depth. Multiple combinations of the diffractive devices may be used to provide a larger range and increased number of focus settings, whereby the secondary focus elements can be used to fine tune the focus distance.

Figure 9:
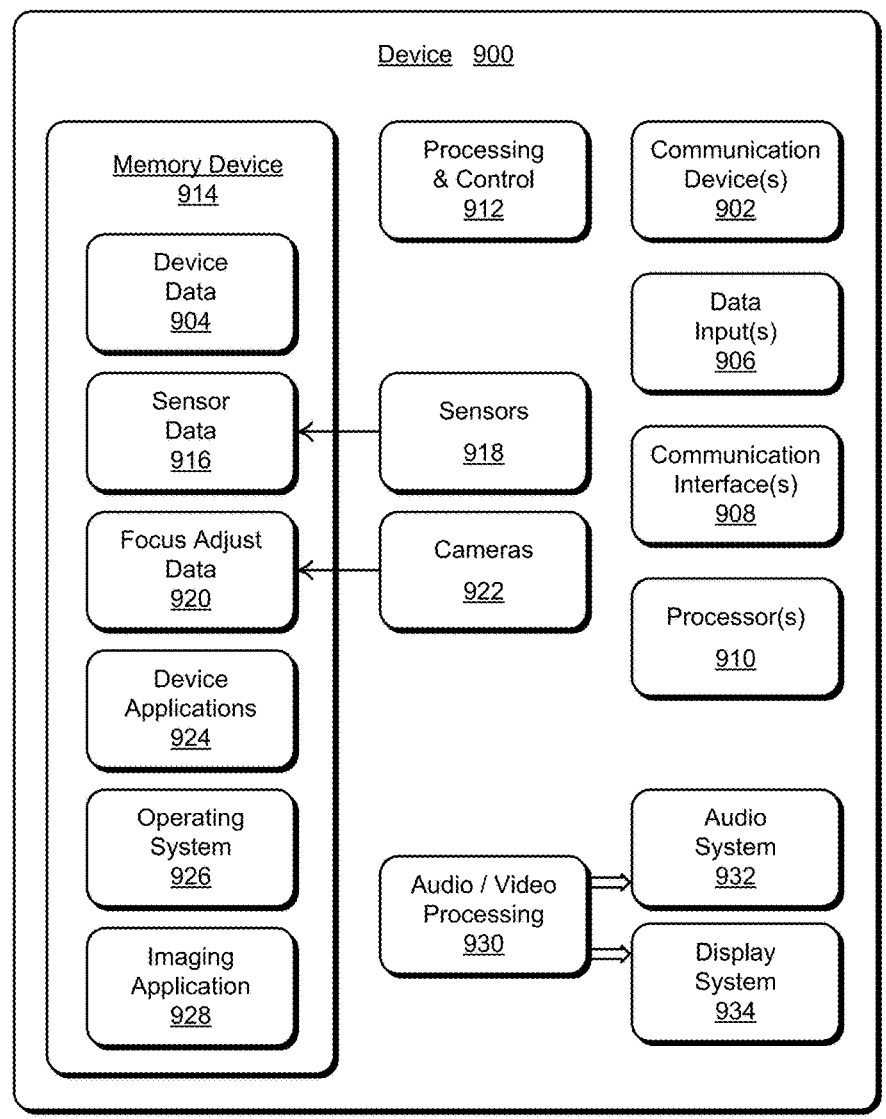
FIG. 9 illustrates various components of an example device that can implement embodiments of waveguide optics focus elements.

FIG. 9 illustrates various components of an example device 900 that can be implemented as any of the devices described with reference to the previous FIGS. 1-8, such as a wearable display device and/or a controller for a wearable display device. In embodiments, the device may be implemented as any one or combination of a fixed or mobile device, in any form of a consumer, computer, portable, communication, phone, navigation, appliance, gaming, media playback, and/or electronic device. The device may also be associated with a user (i.e., a person) and/or an entity that operates the device such that a device describes logical devices that include users, software, firmware, hardware, and/or a combination of devices.

The device 900 includes communication devices 902 that enable wired and/or wireless communication of device data 904, such as virtual image data, as well as video and images data, and other media content stored on the device. The media content stored on the device can include any type of audio, video, and/or image data. The device includes one or more data inputs 906 via which any type of data, media content, and/or inputs can be received, such as user-selectable inputs and any other type of audio, video, and/or image data received from any content and/or data source. The data inputs 906 may include USB ports, coaxial cable, and other serial or parallel connectors (including internal connectors) for flash memory, DVDs, CDs, and the like. The data inputs can be used to couple the device to components, peripherals, and accessories, such as keyboards, microphones, cameras, and any other type of input devices.

The device 900 also includes communication interfaces 908, such as any one or more of a serial, parallel, network, or wireless interface. The communication interfaces provide a connection and/or communication links between the device and a communication network by which other electronic, computing, and communication devices communicate data with the device. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 900 includes one or more processors 910 (e.g., any of microprocessors, controllers, and the like), or a processor and memory system (e.g., implemented in an SoC), which process computer-executable instructions to control the operation of the device. Alternatively or in addition, the device can be implemented with any one or combination of software, hardware, firmware, or fixed logic circuitry that is implemented in connection with processing and control circuits which are generally identified at 912.

The device 900 also includes one or more memory devices 914 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device. Computer-readable storage media can be any available medium or media that is accessed by a computing device.

A memory device 914 provides data storage mechanisms to store the device data 904, sensor data 916 from calibration sensors 918, focus adjust data 920 from cameras 922 and/or from the sensors 918, other types of information and/or data, and device applications 924. For example, an operating system 926 can be maintained as a software application with the memory device and executed on the processors. The device applications may also include a device manager or controller, such as any form of a control application, software application, signal processing and control module, code that is native to a particular device, a hardware abstraction layer for a particular device, and so on. In this example, the device applications also include an imaging application 928 that can implement embodiments of waveguide optics focus elements as described herein.

The device 900 may also include an audio and/or video processing system 930 that generates audio data for an audio system 932 and/or generates display data for a display system 934. The audio system and/or the display system may include any devices that process, display, and/or otherwise render audio, video, display, and/or image data. In implementations, the audio system and/or the display system are external components to the device. Alternatively, the audio system and/or the display system are integrated components of the example device.

Although embodiments of waveguide optics focus elements have been described in language specific to features and/or methods, the appended claims are not necessarily limited to the specific features or methods described. Rather, the specific features and methods are disclosed as example implementations of waveguide optics focus elements.

The invention claimed is:

1. An imaging structure, comprising:
a waveguide configured for viewing of an environment that is viewable, by a user, with the imaging structure, the waveguide further configured to transmit light of a virtual image that is generated by an image microdisplay to appear as part of the environment; and
two or more focus elements integrated within the waveguide such that the environment is viewable by the user through the two or more focus elements,
wherein individual focus elements are configured to be electronically switchable to an on state where the individual focus elements focus the light of the virtual image while the light of the virtual image is within the waveguide or an off state where the individual focus elements do not focus the light of the virtual image within the waveguide,
wherein electronic switching of the two or more focus elements is effective to variably focus the light of the virtual image at a plurality of virtual image focus depths while the light of the virtual image is within the waveguide,
wherein the plurality of virtual image focus depths approximately correlate to environment focus depths as perceived by the user, the environment focus depths determined by information from one or more sensors.

2. An imaging structure as recited in claim 1, wherein one of:
the waveguide is configured for see-through viewing of the environment for augmented-reality viewing of the light of the virtual image in the environment; or
the waveguide is configured for display viewing of the light of the virtual image and the environment that are generated for virtual-reality viewing.

3. An imaging structure as recited in claim 1, wherein the two or more focus elements are each configured for a different virtual image focus depth, and the two or more focus elements are electronically switchable without changing position relative to the waveguide.

4. An imaging structure as recited in claim 1, wherein different virtual image focus depths are provided when different combinations of the two or more focus elements are switched-on or switched-off.

5. An imaging structure as recited in claim 1, wherein the two or more focus elements are arranged so that the light of the virtual image travels through all of the two or more focus elements irrespective of whether the two or more focus elements are in the on state or the off state.

6. An imaging structure as recited in claim 1, wherein the two or more focus elements comprise at least one of:
switchable output diffractive devices;
switchable output reflective devices; or
Switchable Bragg Gratings.

7. An imaging structure as recited in claim 1, wherein the two or more focus elements comprise:
a first switchable output diffractive device configured to focus the light of the virtual image traveling in the waveguide at infinity when switched-on, and propagate the light of the virtual image down the waveguide when switched-off;
a second switchable output diffractive device configured to focus the light of the virtual image traveling in the waveguide an intermediate virtual image focus depth when switched-on, and propagate the light of the virtual image down the waveguide when switched-off; and
a third switchable output diffractive device configured to focus the light of the virtual image traveling in the waveguide at a near virtual image focus depth when switched-on, and propagate the light of the virtual image down the waveguide when switched-off.

8. A method, comprising:
transmitting light of a virtual image in a waveguide, the virtual image generated by an image microdisplay to appear as part of an environment that is viewable by a user through the waveguide; and
variably focusing the light of the virtual image to a plurality of different virtual image focus depths as the light of the virtual image travels through the waveguide, the variably focusing comprising controlling two or more focus elements that are contained within the waveguide and sequentially in a path of the light of the virtual image.

9. A method as recited in claim 8, further comprising: determining a particular focal distance of the environment based at least on focus adjust data that indicates an eye accommodation distance of the user; and
based at least on the particular focal distance of the environment, selecting a particular focus distance at which to focus the light of the virtual image via the two or more focus elements that are contained within the waveguide.

10. A method as recited in claim 8, wherein the variably focusing comprises:
selectively controlling different combinations of the two or more focus elements to be switched-on or switched-off, each combination corresponding to a particular virtual image focus depth.

11. A method as recited in claim 8, wherein the two or more focus elements comprise one of switchable output diffractive devices or switchable output reflective devices.

12. A method as recited in claim 8, wherein the two or more focus elements comprise Switchable Bragg Gratings.

13. A wearable display device, comprising:
left and right display lens systems configured for augmented reality imaging;
left and right imaging units of the respective left and right display lens systems configured to generate an augmented reality image; and a processor or controller,
each of the left and right imaging units comprising:
a waveguide configured for see-through viewing of an environment that is viewable by a user through the waveguide, the waveguide further configured to transmit light of a virtual image that is generated by an image microdisplay to appear as part of the environment; and
two or more focus elements that are:
integrated within the waveguide such that the environment is viewable by the user through the two or more focus elements; and
each electronically switchable as on to focus the light of the virtual image or off so as not to focus the light of the virtual image, the two or more focus elements being switchable effective to variably focus the light of the virtual image while the light of the virtual image is travelling through the waveguide at a plurality of virtual image focus depths,
wherein the processor or controller is configured to control the two or more focus elements so that the variable focus of the light of the virtual image approximately correlates to focal distances of the environment perceived by the user.

14. A wearable display device as recited in claim 13, wherein the two or more focus elements are each configured for a different virtual image focus depth, and the two or more focus elements are electronically switchable without changing position relative to the waveguide.

15. A wearable display device as recited in claim 13, wherein individual virtual image focus depths of the plurality of virtual image focus depths are achieved based on different combinations of the two or more focus elements being switched-on or switched-off.

16. A wearable display device as recited in claim 13, embodied as glasses or a head-mounted display.

17. A wearable display device as recited in claim 13, wherein the two or more focus elements comprise one of switchable output diffractive devices or switchable output reflective devices.

18. A wearable display device as recited in claim 13, wherein the two or more focus elements comprise Switchable Bragg Gratings.

19. A wearable display device as recited in claim 13, wherein the two or more focus elements comprise:
a first switchable output diffractive device configured to focus the light of the virtual image traveling within the waveguide at infinity when switched-on, and propagate the light of the virtual image down the waveguide when switched-off;
a second switchable output diffractive device configured to focus the light of the virtual image traveling within the waveguide at an intermediate virtual image focus depth when switched-on, and propagate the light of the virtual image down the waveguide when switched-off; and
a third switchable output diffractive device configured to focus the light of the virtual image traveling within the waveguide at a near virtual image focus depth when switched-on, and propagate the light of the virtual image down the waveguide when switched-off.

20. A wearable display device as recited in claim 13, further comprising an imaging application configured to execute on the processor and to:
receive focus adjust data that indicates an eye accommodation distance of the user;
determine a current focal distance of the environment based at least on the eye accommodation distance of the user; and
initiate focus control signals to control a combination of the two or more focus elements switched-on or switched-off to select a particular virtual image focus depth from the plurality of virtual image focus depths to match the current focal distance of the environment.

* * * * *